United States Patent
Perron

(10) Patent No.: US 11,271,641 B1
(45) Date of Patent: Mar. 8, 2022

(54) OTDR METHOD FOR END-TO-END OPTICAL FIBER LINK CHARACTERIZATION

(71) Applicant: EXFO Inc., Quebec (CA)

(72) Inventor: Stephane Perron, Quebec (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 16/740,953

(22) Filed: Jan. 13, 2020

Related U.S. Application Data

(60) Provisional application No. 62/792,655, filed on Jan. 15, 2019, provisional application No. 62/799,121, filed on Jan. 31, 2019, provisional application No. 62/818,950, filed on Mar. 15, 2019.

(51) Int. Cl.
*H04B 10/071* (2013.01)
*G01M 11/00* (2006.01)

(52) U.S. Cl.
CPC ........ *H04B 10/071* (2013.01); *G01M 11/3136* (2013.01); *G01M 11/3145* (2013.01); *G01M 11/3154* (2013.01)

(58) Field of Classification Search
CPC ..... H04B 10/07; H04B 10/071; G01M 11/31; G01M 11/3109; G01M 11/3118; G01M 11/3127; G01M 11/3136; G01M 11/3145; G01M 11/3154; G01M 11/3163
USPC ........................................................ 356/73.1
See application file for complete search history.

(56) References Cited

U.S. PATENT DOCUMENTS

| | | | |
|---|---|---|---|
| 5,155,439 A | 10/1992 | Holmbo et al. | |
| 5,305,078 A | 4/1994 | Lamonde | |
| 5,442,434 A * | 8/1995 | Liao | G01M 11/3145 356/73.1 |
| 5,455,672 A | 10/1995 | Lamonde et al. | |
| 5,528,356 A | 6/1996 | Harcourt | |

(Continued)

FOREIGN PATENT DOCUMENTS

| | | |
|---|---|---|
| CN | 102088315 A | 6/2011 |
| CN | 201947269 U | 8/2011 |

(Continued)

OTHER PUBLICATIONS

Roux et al., New Breakthroughs in Faster and Easier Fiber Testing, All-in-one solutions for one-button, automated testing, Jul. 2012, 30173223 000 0712, JDS Uniphase Corporation.

(Continued)

*Primary Examiner* — Gordon J Stock, Jr.
(74) *Attorney, Agent, or Firm* — Helene Chotard

(57) ABSTRACT

There is therefore provided an OTDR method for characterizing an optical fiber link, wherein a receive device comprising a reflective optical signature and a receive fiber is connected at a remote end of the optical fiber link under test. The reflective optical signature is detected using an OTDR acquisition and link continuity is verified. Because detection of the reflective optical signature rely on high-intensity reflective peaks of the reflective optical signature and not on RBS level, dynamic range constraints are relaxed and so is the averaging time. Advantageously, the method may be employed to detect the reflective optical signature, verify link continuity, measure total link length, measure total insertion loss and/or determine a polarity of a multi-fiber array cable link.

20 Claims, 13 Drawing Sheets

(56) References Cited

U.S. PATENT DOCUMENTS

| | | | |
|---|---|---|---|
| 5,708,500 A | 1/1998 | Anderson | |
| 6,160,614 A | 12/2000 | Unno | |
| 6,710,862 B1 * | 3/2004 | Wilson | G01M 11/3145 356/73.1 |
| 6,970,237 B1 * | 11/2005 | Stolte | G01M 11/31 356/73.1 |
| 7,515,276 B2 | 4/2009 | Froggatt et al. | |
| 7,808,621 B2 | 10/2010 | Russell | |
| 8,218,924 B1 * | 7/2012 | Schantz | H04B 10/071 385/100 |
| 8,482,725 B2 | 7/2013 | Perron et al. | |
| 8,576,389 B2 | 11/2013 | Perron et al. | |
| 8,655,167 B1 * | 2/2014 | Lam | H04J 14/0227 398/21 |
| 8,711,341 B2 | 4/2014 | Blair et al. | |
| 9,184,833 B2 | 11/2015 | Kassler | |
| 9,228,922 B1 * | 1/2016 | Doddridge | G01M 11/3136 |
| 9,360,392 B2 | 6/2016 | Benjamin | |
| 9,419,707 B2 | 8/2016 | Daems | |
| 9,435,713 B2 | 9/2016 | Collier et al. | |
| 9,709,460 B2 | 7/2017 | Leblanc et al. | |
| 9,900,087 B2 | 2/2018 | Ruchet | |
| 9,973,271 B2 | 5/2018 | Jin et al. | |
| 10,200,118 B2 | 2/2019 | Ruchet | |
| 10,288,524 B2 * | 5/2019 | Leclerc | G01M 11/3136 |
| 10,371,596 B2 * | 8/2019 | L'Heureux | G01M 11/3136 |
| 10,862,582 B1 * | 12/2020 | L'Heureux | H04B 10/035 |
| 11,092,513 B1 * | 8/2021 | Paradis | G01M 11/3109 |
| 2014/0146312 A1 | 5/2014 | Perron et al. | |
| 2014/0198311 A1 | 7/2014 | L'Heureux et al. | |
| 2015/0062562 A1 * | 3/2015 | Kassler | H04B 10/071 356/73.1 |
| 2015/0198503 A1 * | 7/2015 | Leblanc | G01M 11/31 356/73.1 |
| 2016/0041065 A1 * | 2/2016 | L'Heureux | G01M 11/3154 356/73.1 |
| 2016/0248499 A1 | 8/2016 | Perron | |
| 2017/0234767 A1 * | 8/2017 | Leclerc | G01M 11/3145 356/73.1 |
| 2020/0116591 A1 * | 4/2020 | Perron | G01M 11/3145 |
| 2020/0200645 A1 * | 6/2020 | Perron | G01M 11/3145 |
| 2021/0199536 A1 * | 7/2021 | Perron | G01M 11/3127 |

FOREIGN PATENT DOCUMENTS

| | | | | |
|---|---|---|---|---|
| EP | 2955861 A1 | 12/2015 | | |
| WO | WO-2010043056 A1 * | 4/2010 | | H04B 10/0795 |
| WO | 2010076567 A1 | 7/2010 | | |
| WO | WO-2017076189 A1 * | 5/2017 | | H04B 10/071 |

OTHER PUBLICATIONS

Park et al., Coded optical time domain reflectometry: principle and applications, Proc. of SPIE vol. 6781, 678129 (2007).

Viavi Solutions, Viavi T-Berd/MTS 2000: Using the OTDR in Real Time Mode, https://www.youtube.com/watch?v=jVvElvHl9l8&feature=youtu.be, uploaded on Oct. 10, 2017.

\* cited by examiner

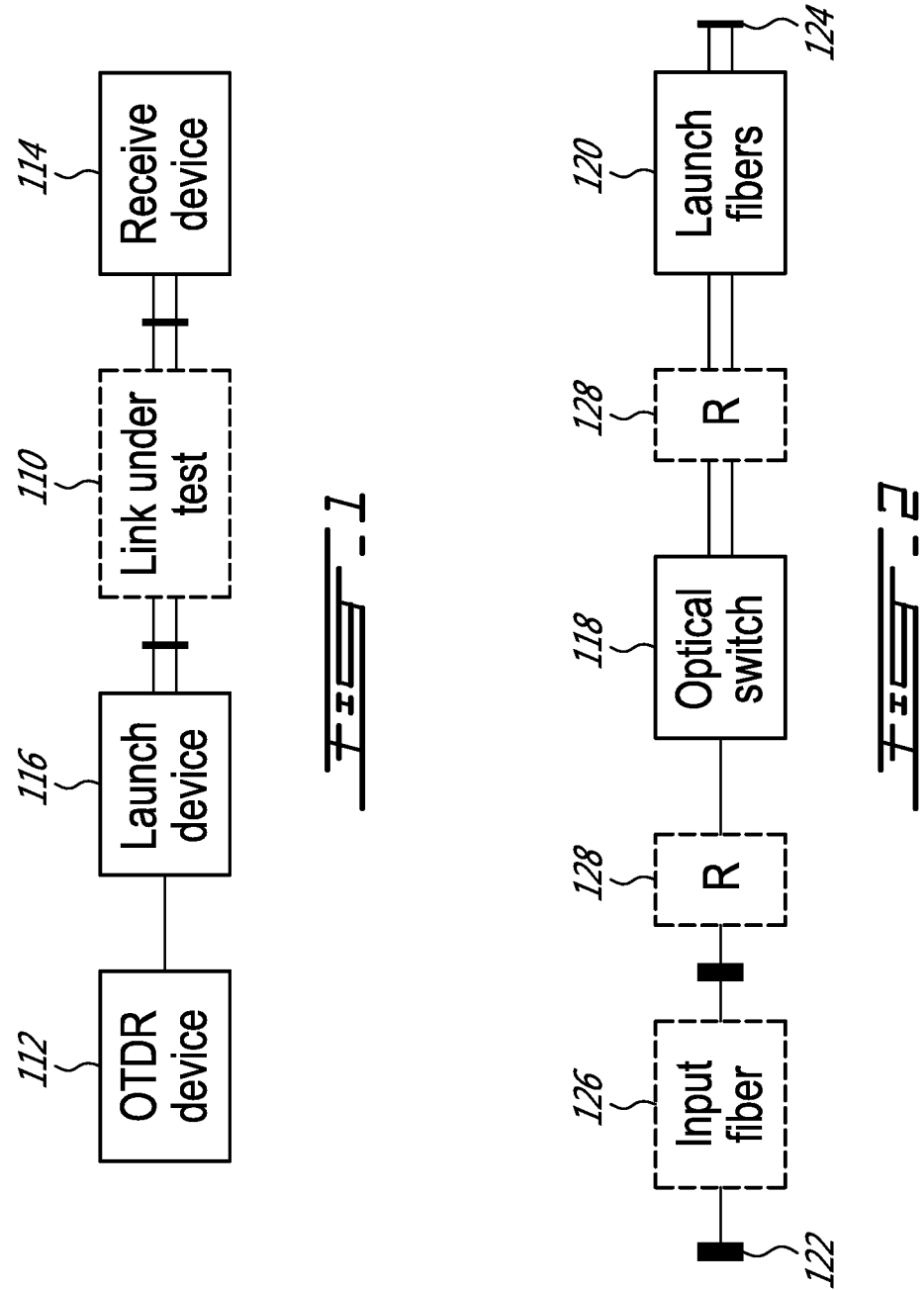

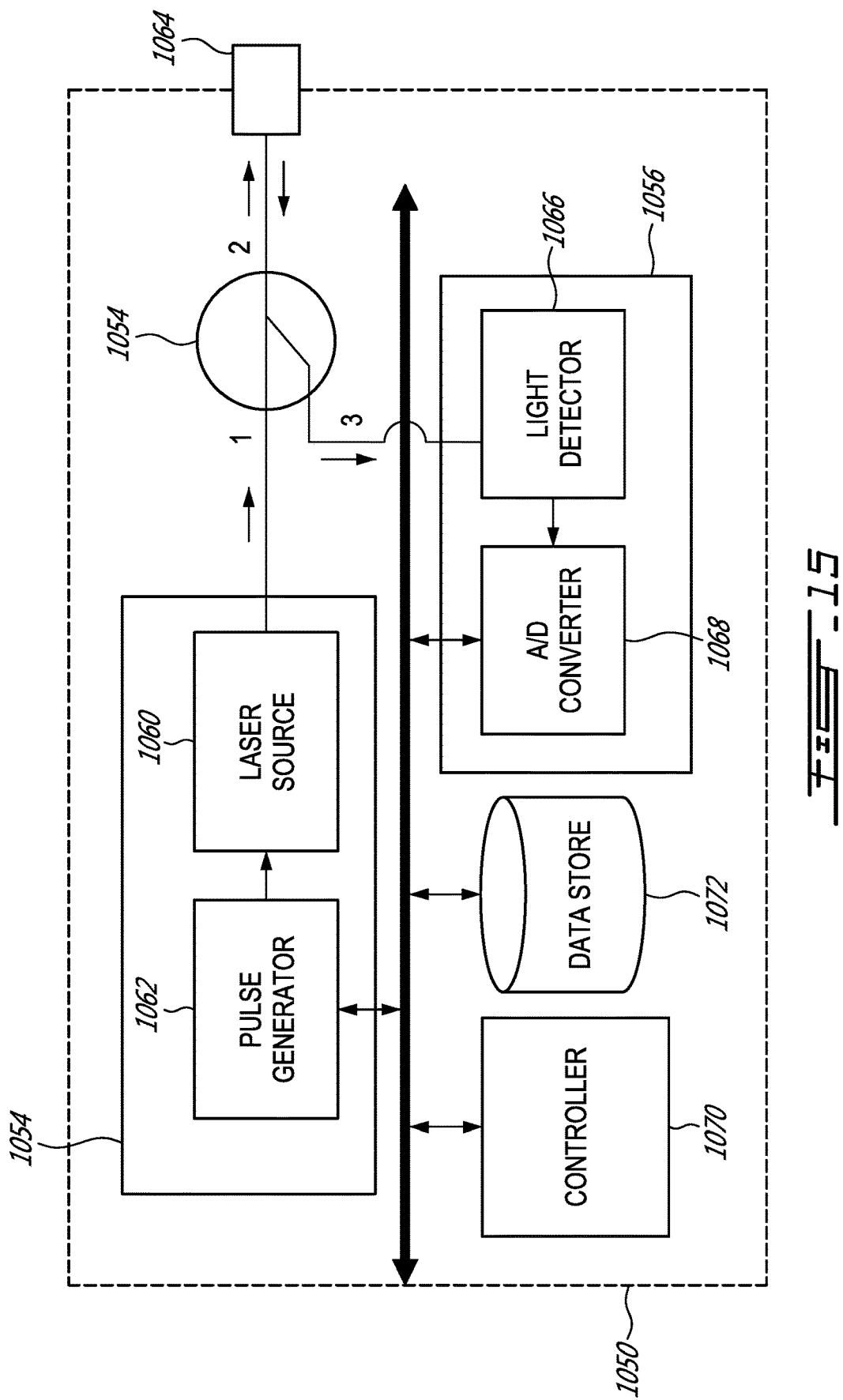

OTDR METHOD FOR END-TO-END OPTICAL FIBER LINK CHARACTERIZATION

TECHNICAL FIELD

The present description generally relates to Optical Time-Domain Reflectometry (OTDR), and more particularly to end-to-end characterization of optical fiber links using an Optical Time-Domain Reflectometer.

BACKGROUND

The position of receiving and transmitting optical fibers at a multi-fiber array cable connector defines what is referred to in the industry as the polarity. Various multi-fiber array cable types are defined by the TIA/EIA-568-C.3 Standard, each having a specific 1×12 or 2×12 fiber arrangement (i.e. Type A, Type B and Type C (1×12)). Other proprietary or custom multi-fiber array cabling systems also exist. The multi-fiber array cable type or fiber arrangement is referred to herein as the "polarity" of a multi-fiber array cable or link.

Tier-1 (or "basic") fiber optic testing is a measurement of end-to-end characteristics of a fiber optic link, i.e. from one end to the other. These characteristics include the total link insertion loss and the continuity, and may also include the total link length and/or optical fiber link polarity. Standard organizations recommend the use of a Light Source-Power Meter (LS/PM) solution to perform Tier-1 testing.

Optical Loss Test Sets (OLTS) are advanced implementations of the LS/PM solution. OLTSs allow to perform what is called "real-time continuity". OLTS units are working in pair wherein each unit is constantly monitoring communications received from the other one. Two costly test instruments are therefore required (one at each end of the optical fiber link under test).

LS/PM solutions, including OLTSs, rely on a power reference procedure to take care of source/optics stability issues. The reference procedure increases the overall measurement process time and is subject to manipulation errors likely to cause unreliable measurements.

Tier-2 (or "extended") fiber optic testing is used to characterize each loss contributor and potential issue along the link. Tier-2 testing is performed using an Optical Time-Domain Reflectometry (OTDR—also used to refer to the corresponding device). OTDR is a diagnostic technique where light pulses are launched in an optical fiber link and the returning light, arising from backscattering and reflections along the fiber link, is detected and analyzed. Various "events" along the fiber link can be detected and characterized through a proper analysis of the returning light in the time domain and insertion loss of the fiber link under test, as well as each component along the link, can be characterized. In OTDR measurements, there is no need for a power reference step as described above.

Prior art OTDR methods can perform end-to-end measurements on optical fiber links using a single OTDR instrument connected at the near end of the optical fiber link under test. However, when there is no test instrument at the remote end, link continuity verification is based on an analysis of the fiber Rayleigh Backscattering (RBS) level, which does not provide a robust link continuity verification. Link continuity cannot be confirmed because there is no unambiguous detection of the end of fiber. Adding a receive fiber at the far end of the link under test does not solve the ambiguity issue. Furthermore, OTDR measurements can be dependent on measurement settings as selected by the user. With wrong pulse width, averaging time or acquisition range, inaccurate link lengths and/or insertion losses can be returned by the unit. As such, OTDRs are not used in the industry to perform Tier-1 testing.

The reliability of the link continuity verification can be significantly improved by connecting an encoded receive device at the remote end of the optical fiber link under test. However, conventional OTDR methods rely on a global characterization of the optical fiber link, including the characterization of each event in order to detect the encoded receive device. Such measurement generally requires a multi-pulsewidth approach as well as a long averaging time to provide enough spatial resolution to detect and characterize short fiber segments. The long measurement time required for such characterization is not adapted to high-volume testing such as those required, e.g., in the context of data centers and especially web-scale data centers where the number of individual tests to be carried out is enormous. Although multi-pulsewidth automation is more precise and reliable than user-selected settings, the method still cannot guarantee the continuity of the optical link.

In a data center context, it is often mandatory to certify each newly installed fiber. For example, in web-scale data centers, the number of individual tests to be carried out is enormous. In this context, it becomes important to optimize the time efficiency of Tier-1 testing, including any required power reference step.

There is therefore a need for an OTDR measurement method that can provide fast and reliable end-to-end characterization of optical fiber links including link continuity verification, link length measurement and/or total insertion loss measurement.

SUMMARY

There is therefore provided an OTDR method for characterizing an optical fiber link, wherein a receive device comprising a reflective optical signature and a receive fiber is connected at a remote end of the optical fiber link under test. The reflective optical signature is detected using an OTDR acquisition and link continuity is verified. A value of total link length is measured from the position of the reflective optical signature in the OTDR acquisition. Because detection of the reflective optical signature and thereby total link length measurement rely on high-intensity reflective peaks of the reflective optical signature and not on RBS level, dynamic range constraints are relaxed and so is the averaging time. Detection of the optical signature also confirms link continuity. Optionally, a value of total insertion loss of the link under test may further be derived from a relative power level of at least one reflectance peak of the reflective optical signature or from the RBS level of a fiber section selected upstream from the reflectance peaks.

Advantageously, for a wide range of optical fiber link characteristics, a single OTDR acquisition performed with pre-set acquisition parameters may therefore be employed to detect the reflective optical signature, verify link continuity and measure total link length, which provides a fast and reliable link continuity verification and link length measurement.

Such technology allows fast and reliable Tier-1 fiber optic testing, and this without any power reference procedure.

In accordance with one aspect, there is provided an OTDR method for characterizing a total length of an optical fiber link connected at a remote end to a receive device comprising a reflective optical signature and a receive fiber, the OTDR method comprising:

performing at least a first OTDR acquisition toward the optical fiber link, wherein each OTDR acquisition is performed by propagating in the optical fiber link under test, a test signal corresponding to a first set of acquisition parameters and detecting corresponding return light signal from the optical fiber link so as to obtain an OTDR trace representing backscattered and reflected light as a function of distance in the optical fiber link;

in the acquired OTDR trace, detecting a signature pattern corresponding to said reflective optical signature to derive a position thereof; and deriving a value of a total length of the optical fiber link under test using the derived position.

Because signature pattern detection and total link length measurement rely on high-intensity reflective peaks of the reflective optical signature, and not on RBS level, dynamic range constraints are relaxed and so is the averaging time. A single pre-set OTDR acquisition may therefore be employed for a wide range of optical fiber link characteristics, which provides fast and reliable link continuity verification and link length measurement.

In accordance with another aspect, there is provided an OTDR method for characterizing an optical fiber link under test connected at a remote end to a receive device comprising a reflective optical signature and a receive fiber, the OTDR method comprising:

performing at least a first OTDR acquisition toward the optical fiber link, wherein each OTDR acquisition is performed by propagating in the optical fiber link under test, a test signal corresponding to a first set of acquisition parameters and detecting corresponding return light signal from the optical fiber link so as to obtain an OTDR trace representing backscattered and reflected light as a function of distance in the optical fiber link;

in the acquired OTDR trace, detecting a signature pattern corresponding to said reflective optical signature to derive a position thereof;

deriving a first value of the total insertion loss of the link under test, at least from a relative power level of at least one reflectance peak of the signature pattern;

determining values of a second set of acquisition parameters at least as a function of the derived first value of the total insertion loss and the derived position of the reflective optical signature;

performing a second OTDR acquisition toward the optical fiber link using the second set of acquisition parameters to obtain a second OTDR trace wherein the Rayleigh Backscattering level associated with the receive fiber is measurable; and deriving a second value of the total insertion loss of the link under test from said second OTDR trace.

In accordance with another aspect, there is provided an OTDR method for characterizing an optical fiber link under test connected at a remote end to a receive device comprising a reflective optical signature and a receive fiber, the OTDR method comprising:

performing at least a first OTDR acquisition toward the optical fiber link, wherein each OTDR acquisition is performed by propagating in the optical fiber link under test, a test signal corresponding to a first set of acquisition parameters and detecting corresponding return light signal from the optical fiber link so as to obtain an OTDR trace representing backscattered and reflected light as a function of distance in the optical fiber link;

in the acquired OTDR trace, detecting a signature pattern corresponding to said reflective optical signature to derive a position thereof;

deriving a distance range where to measure a Rayleigh Backscattering level of the receive fiber, from the derived position of the reflective optical signature; and deriving a value of the total insertion loss of the link under test, from the Rayleigh Backscattering level within the derived distance range.

In accordance with another aspect, there is provided an OTDR method for characterizing an optical fiber link under test connected at a remote end to a receive device comprising a reflective optical signature and a receive fiber, the OTDR method comprising:

performing at least a first OTDR acquisition toward the optical fiber link, wherein each OTDR acquisition is performed by propagating in the optical fiber link under test, a test signal corresponding to a first set of acquisition parameters and detecting corresponding return light signal from the optical fiber link so as to obtain an OTDR trace representing backscattered and reflected light as a function of distance in the optical fiber link;

in the acquired OTDR trace, detecting a signature pattern corresponding to said reflective optical signature to derive a position thereof; and deriving a value of a total length of the optical fiber link under test using the derived position;

wherein the position of the signature pattern is derived by comparing the acquired OTDR trace to a segment that is extracted from a calibration OTDR acquisition and that is representative of the signature pattern, the calibration OTDR acquisition being performed towards the receiver device without the link under test.

In accordance with another aspect, there is provided an OTDR method for characterizing a total length of an optical fiber link under test connected at a remote end to a receive device comprising a reflective optical signature and a receive fiber, the OTDR method comprising:

performing at least a first OTDR acquisition toward the optical fiber link, wherein each OTDR acquisition is performed by propagating in the optical fiber link under test, a test signal corresponding to a first set of acquisition parameters and detecting corresponding return light signal from the optical fiber link so as to obtain an OTDR trace representing backscattered and reflected light as a function of distance in the optical fiber link;

in the acquired OTDR trace, detecting a signature pattern corresponding to said reflective optical signature to derive a position thereof;

deriving a value of a total length of the optical fiber link under test using the derived position;

wherein said optical fiber link under test is a multi-fiber array cable link and wherein the receive device comprises reflective optical signatures, and wherein said method further comprises:

performing at least a first OTDR acquisition toward at least one optical fiber path of the multi-fiber array cable link;

in the acquired OTDR trace, detecting a signature pattern corresponding to a corresponding one of the reflective optical signatures; and determining a polarity of the said multi-fiber array cable link from the detected signature pattern.

In accordance with another aspect, there is provided an OTDR device for characterizing an optical fiber link under test connected at a remote end to a receive device comprising a reflective optical signature and a receive fiber, the OTDR device comprising:

an OTDR acquisition device connectable toward an end of the optical fiber link for performing at least a first OTDR acquisition toward the optical fiber link, wherein each OTDR acquisition is performed by propagating in the optical fiber link under test, a test signal corresponding to a set of acquisition parameters and detecting corresponding return light from the optical fiber link so as to obtain an OTDR trace representing backscattered and reflected light as a function of distance in the optical fiber link; and a processing unit receiving the acquired OTDR trace and configured for in the acquired OTDR trace, detecting a signature pattern corresponding to said reflective optical signature to derive a position thereof; and deriving a first value of the total insertion loss of the link under test, at least from a relative power level of at least one reflectance peak of the signature pattern determining values of a second set acquisition parameters at least as a function of the derived first value of the total insertion loss and the derived position of the reflective optical signature;

deriving a second value of the total insertion loss of the link under test from a second OTDR trace performed toward the optical fiber link using the second set of acquisition parameters, wherein the Rayleigh Backscattering level associated with the receive fiber is measurable in the second OTDR trace.

In accordance with another aspect, there is provided an OTDR device for characterizing an optical fiber link under test connected at a remote end to a receive device comprising a reflective optical signature and a receive fiber, the OTDR device comprising:

an OTDR acquisition device connectable toward an end of the optical fiber link for performing at least a first OTDR acquisition toward the optical fiber link, wherein each OTDR acquisition is performed by propagating in the optical fiber link under test, a test signal corresponding to a set of acquisition parameters and detecting corresponding return light from the optical fiber link so as to obtain an OTDR trace representing backscattered and reflected light as a function of distance in the optical fiber link; and a processing unit receiving the acquired OTDR trace and configured for in the acquired OTDR trace, detecting a signature pattern corresponding to said reflective optical signature to derive a position thereof; and deriving a distance range where to measure a Rayleigh Backscattering level of the receive fiber, from the derived position of the reflective optical signature; and deriving a value of the total insertion loss of the link under test, from the Rayleigh Backscattering level within the derived distance range.

In accordance with another aspect, there is provided an OTDR device for characterizing an optical fiber link under test connected at a remote end to a receive device comprising a reflective optical signature and a receive fiber, the OTDR device comprising:

an OTDR acquisition device connectable toward an end of the optical fiber link for performing at least a first OTDR acquisition toward the optical fiber link, wherein each OTDR acquisition is performed by propagating in the optical fiber link under test, a test signal corresponding to a set of acquisition parameters and detecting corresponding return light from the optical fiber link so as to obtain an OTDR trace representing backscattered and reflected light as a function of distance in the optical fiber link; and a processing unit receiving the acquired OTDR trace and configured for in the acquired OTDR trace, detecting a signature pattern corresponding to said reflective optical signature to derive a position thereof;

deriving the position of the signature pattern by comparing the acquired OTDR trace to a segment that is extracted from a calibration OTDR acquisition and that is representative of the signature pattern, the calibration OTDR acquisition being performed towards the receiver device without the link under test; and deriving a value of a total length of the optical fiber link under test using the derived position.

In some cases, the RBS level associated with the receive fiber may not be measurable in the acquired OTDR trace. Accordingly, in one embodiment, a value of the total insertion loss of the link under test may be derived from a relative power level of at least one reflectance peak of the reflective optical signature.

The predetermined characteristic(s) of the signature pattern is(are) may be derived from a calibration measurement or defined with typical values. In one embodiment, a calibration OTDR acquisition may be performed towards the receive device without the link under test.

If the RBS level of the receive fiber is measurable in the acquired OTDR trace, the total insertion loss of the link under test may be derived directly.

However, if the RBS level of the receive fiber is not measurable in the acquired OTDR trace, a second OTDR acquisition may optionally be performed using a second set of OTDR acquisition parameters, in order to improve the total insertion loss measurement accuracy. In one embodiment, values of a second set of acquisition parameters are determined at least as a function of the derived first value of the total insertion loss and the derived position of the reflective optical signature.

A second OTDR acquisition may be performed towards the optical fiber link using the second set of acquisition parameters to obtain a second OTDR trace wherein the RBS level associated with the receive fiber is measurable. A value of the total insertion loss of the link under test may derived from said second OTDR trace. A complete Tier-1 fiber optic testing can therefore be obtained.

In one embodiment, a distance range where to measure the RBS level of the receive fiber may be derived from the derived position of the reflective optical signature; and a value of the total insertion loss of the link under test may be derived from an RBS level within the derived distance range.

The first set of acquisition parameters may be pre-set independently of the actual total length and/or total insertion loss of the link under test.

In one embodiment, total insertion loss and total length measurements are repeated in a continuous manner and are stored upon request by the user.

In one embodiment, the position of the signature pattern is derived by comparing the acquired OTDR trace to a segment extracted from a calibration OTDR acquisition and that is representative of the signature pattern and the calibration OTDR acquisition is performed towards the receiver device without the link under test. The comparison may be obtained by calculating a cross-correlation between the segment and the acquired OTDR trace. The signature pattern can be assumed to remain stable in time for a given temperature range and therefore, contrary to the power reference step required for OLTS measurements, the calibration OTDR acquisition need not be repeated over time and can be performed once for all or at least for a relatively long period of time such as months or years.

In one embodiment, the optical fiber link under test may be a multi-fiber array cable link and the receive device may comprise reflective optical signatures. At least a first OTDR acquisition may be performed toward at least one optical fiber path of the multi-fiber array cable link. In the acquired OTDR trace, a signature pattern corresponding to a corresponding one of the reflective optical signatures may be detected. A polarity of the multi-fiber array cable link may then be determined from the detected signature patterns.

BRIEF DESCRIPTION OF THE DRAWINGS

FIG. 1 is a block diagram illustrating an OTDR test system, in accordance with one embodiment.

FIG. 2 is a block diagram illustrating a launch device for use in the OTDR test system 100 of FIG. 1, in accordance with one embodiment.

FIG. 13 comprises FIG. 13A and FIG. 13B and illustrates a method to determine relative bias values associated with each launch and receive fibers for subsequent correction of the optical loss measurements.

FIG. 15 is a block diagram illustrating an example architecture of an OTDR acquisition device of the OTDR device of FIG. 14.

Figure 3:
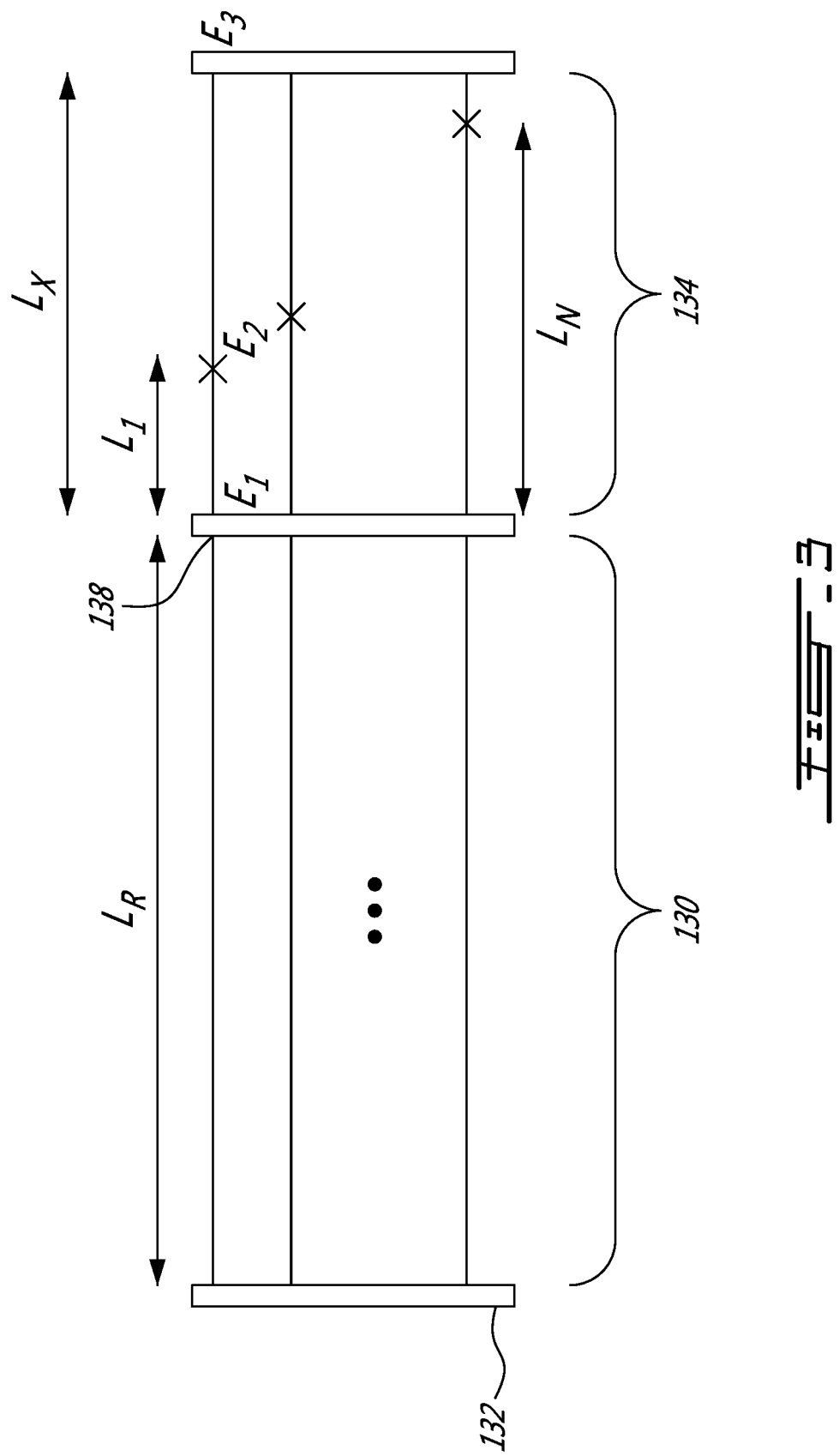
FIG. 3 is a block diagram illustrating a receive device for use in the test system of FIG. 1, in accordance with one embodiment.

It will be noted that throughout the drawings, like features are identified by like reference numerals. It should be understood herein that elements of the drawings are not necessarily depicted to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

Now referring to the drawings, FIG. 1 shows an example of an OTDR test system 100 configured to test an optical fiber link under test 110 (also referred to herein as the "link under test" (LUT)) that can either consist of a simplex fiber, a duplex fiber or a multi-fiber array cable link under test 110. As known in the art, OTDR acquisitions are typically performed with an optional launch fiber and an optional receive fiber, respectively connected to the near and the remote ends of the link under test 110, in order to allow total loss characterization of the link, including characterization of input and output connectors. The OTDR test system 100 of FIG. 1 comprises an OTDR device 112, a launch device 116 comprising launch fiber(s) and connected to the near end of the link under test 110 and a receive device 114 comprising receive fiber(s) and connected to the remote end of the link under test 110. The OTDR device 112 comprises a processing unit configured with an OTDR controller to coordinate the OTDR method described herein in order to launch OTDR acquisitions according to predetermined and/or or selected OTDR acquisition parameters; and an OTDR analyzer module to analyze acquired OTDR trace(s) in order to derive therefrom characteristics of the optical fiber link under test 110.

It is noted that although the OTDR test system 100 and test method are illustrated herein in the context of testing multi-fiber array cable links, the same can be applied equivalently to simplex and duplex fiber links. It will be understood that no optical switch and no loopback devices are required in this case and single launch and receiver fibers. The link under test 110 may thus comprise a simplex fiber, a duplex link or a multi-fiber array cable link with MPO/MTP connectors for instance.

Launch Device

FIG. 2 shows an example of a launch device 116 for use in the OTDR test system 100 of FIG. 1 in the case of testing multi-fiber array cable links. The launch device 116 comprises an optional input fiber lead 126, an optical switch 118 and an array of launch fibers 120, and is connected at one end towards the OTDR device 112 via an input connector interface 122 and at the other end towards the multi-fiber array cable link under test 110 via an output connector interface 124.

The optical switch 118 receives the OTDR test signal at one end and is configured to launch the same towards a selected one of the multi-fiber paths of the link under test 110. The optical switch 118 can be used to launch an OTDR acquisition towards each one of the multi-fiber paths, typically in sequence. The optical switch 118 is bidirectional to allow the light signal returned from the optical fiber link under test to propagate back to the OTDR device 112 for OTDR acquisition.

The optical switch 118 is connected at the other end towards an array of launch fibers 120. Each fiber of the array 120 is also referred to herein as a launch fiber. Each of the launch fibers consists of a fiber section selected to generate a measurable level of RBS. The array of launch fibers 120 is connected at the near end of the link under test 110 for total insertion loss measurement. The array of launch fibers 120 may optionally be provided as a spool that may be made easily replaceable when the output connector interface 124 is worn.

It is noted that, in some embodiments, the optical switch 118 may be integrated directly within the OTDR device 112, with or without the array of launch fibers 120. In the illustrated embodiment, the optical switch is included in a launch device 116 that is made separate from the OTDR device 112 and configured to be connected to the OTDR device 112 via the input connector interface 122 during use.

In the latter case, an optional input fiber lead 126 may be inserted between the input connector interface 122 and the optical switch 118 and be made to be replaced when the connector interface with the OTDR device is worn.

Optionally, the launch device 116 may further comprise one or more reference reflectance features 128 before and/or after the optical switch 118, which may be used to monitor the insertion loss of the optical switch 118 during use and/or, as explained hereinbelow, to compensate for any pulse width and/or receiver bandwidth discrepancy between the calibration and the measurement OTDR acquisitions.

The optical switch 118 can be either controlled via the controller or the OTDR device 112 or via a separate controller.

Receive Device

The receive device 114 is described with reference to FIGS. 3 and 4 which show different embodiments of a receive device 114 for use in the test system of FIG. 1. In both cases, the receive device 114 comprises an input connector interface 132 for connection towards the link under test 110, an array of receive fibers 130 and an array of signed optical fiber paths 134 or 136 each comprising a reflective optical signature.

The signed optical fiber paths 134 or 136 are embodied as segments of optical fibers along which event features—such as connectors, splices, an end of fiber (connectorized or not) or any other element along the optical paths 134 or 136 that may produce a detectable reflectance peak on acquired OTDR traces—are disposed in order to generate a signature pattern that is detectable and recognizable on an OTDR trace acquired by the OTDR device 112 based on at least one characteristic of the signature pattern.

Each fiber of the array of receive fibers 130 is also referred to herein as a receive fiber. Each of the receive fibers consists of a fiber section selected to generate a measurable level of RBS. The array of receive fibers 130 is connected at the remote end of the link under test 110 for total insertion loss measurement. The array of receive fibers 130 may be provided as a spool that may be made to be easily replaced via a connection interface 138 (see FIG. 3) when the input connector interface 132 is worn.

It is noted that although in the embodiments of FIGS. 1 to 4, the array of receive fibers 130 is integrated in the receive device 114 and is made continuous with the signed optical fiber paths 134 or 136, it will be understood that it may be made physically separate from and connectable to the signed optical fiber paths 134 or 136, e.g., via a connection interface such as connection interface 138.

In order to allow polarity detection, the signature patterns may be made unique among the other signatures for some or all the signed optical fiber paths 134 or 136.

Figure 4:
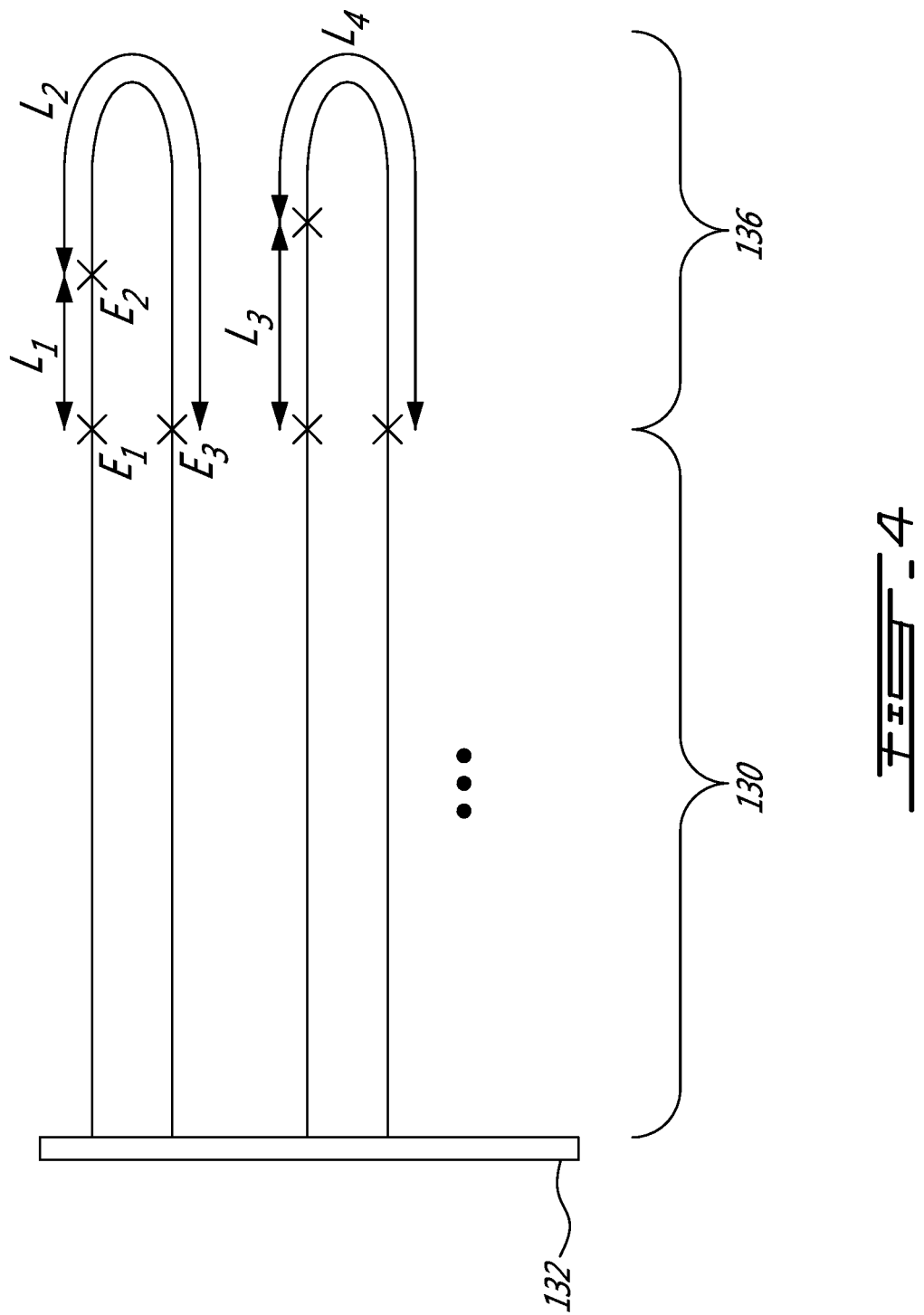
FIG. 4 is a block diagram illustrating a receive device for use in the test system of FIG. 1, in accordance with another embodiment wherein receive fibers are looped back in pairs.

In the embodiment of FIG. 4, the reflective optical signatures are pass-through, low-loss and are used to loopback a pair or pairs of receive fibers to enable bidirectional OTDR measurement from a single end of the link under test 110. In this case, the reflective optical signatures may be made directionality asymmetric to provide a distinguishable signature pattern for each signed optical fiber path 136 and thereby allow for polarity detection. Alternatively, each signed optical fiber paths 134 or 136 may have its own signature and signed optical fiber paths 136 be connected in pairs at their remote end to create loops.

Signature Patten

In practice, an inventory of receive devices 114 of the same type (simplex, duplex, MPO) may contain receive devices 114 that are made identical, receive devices 114 that are different but with a limited number of versions of signature patterns, or with unlimited number of versions of signature patterns such that each signature pattern is potentially unique.

Each signature pattern is produced in an OTDR trace by the presence of a reflective optical signature in the signed optical fiber path 134 or 136 and is used by the OTDR device 112 to check for continuity between the OTDR device 112 and the receive device 114 via the link under test 110, i.e. to check that the OTDR test signal reaches the end of the link under test 110, for reliable insertion loss measurement.

Each reflective optical signature comprises one or more reflective event features E1, E2, E3 disposed along the signed optical fiber path 134 or 136. The event features E1, E2, E3 consist of features that are detectable on acquired OTDR traces by generating distinct reflective events. Characteristics of signature patterns associated with the event features can be used to recognize a presence of a reflective optical signature, and therefore of the receive device 114, and/or to distinguish distinct signature patterns from one another for polarity detection. These characteristics may include, for example, reflection amplitudes of reflective events, distance values between reflective events, etc. One or more signature pattern characteristics allow reliable recognition of the receive device 114 via a single acquisition performed by the OTDR device 112.

In some embodiments, the event features E1, E2, E3 are produced by non-angle polished physical contact connections (such as a FC/PC connector) introduced along the optical fiber path 134 or 136 and spaced apart by a determined distance. A characteristic of the signature pattern can be defined by the optical distance L1 between event features E1 and E2, which defines a characteristic that is detectable on an acquired OTDR trace. With this embodiment, a given unique signature pattern may be recognized in an OTDR trace by identifying, at a position along the OTDR trace that is consistent with the position of the receive device 114, two reflective events that are mutually spaced by a predetermined optical distance L1.

In some embodiments, the input interface 132 and/or the connection interface 138 may also serve as event features and an optical distance $L_R$ in-between be recognizable as a characteristic.

In the embodiments of FIGS. 3 and 4, the distance Lx between the first event feature E1 and the third event feature E3 is made equal for each signed optical fiber path 134, 136 such that signature patterns are easily recognizable by finding three reflective events and a distance Lx in the OTDR trace. Conversely, the distance L1 between the first event feature E1 and the second event feature E2 is made unique for each optical fiber path of the array of signed optical fiber paths 134, 136.

Although in theory, a single event feature having a specific characteristic, e.g. a determined reflectivity value, may be enough to recognize the presence of the receive device 114, reliability of the recognition may be largely improved with at least two event features.

In some embodiments where the optical link under test is a multi-fiber array cable link, a single event feature can be used for each optical fiber path 134, 136 such that the set formed by the plurality of single event features of the set of optical fiber paths 134, 136 can provide highly reliable recognition. If one event feature is found on each of the plurality of OTDR traces acquired respectively toward the plurality of optical fiber paths, the positions at which the event features are found relative to one another may be used to increase recognition reliability. For example, if each optical fiber path shows an event feature at a position that matches the others (within a predetermined possible variability of event feature positions), these event features can be reliably recognized. Conversely, an event feature that is found at a position that does not match those found for other fiber paths may be rejected. Connectivity of the whole multi-fiber array cable link can only be confirmed if an event feature is found at positions that matches predetermined rules on all optical fiber paths. This technique may be made reliable for multi-fiber array cable of about 8 or more optical fiber paths, where all optical fiber paths have the same length.

Other optical configurations that may be used to produce signature patterns are described, for example, in U.S. Pat. No. 8,482,725 which is commonly owned by Applicant and hereby incorporated by reference (see FIGS. 3, 4 and 5 and the related description).

The one or more characteristics of each signature pattern (e.g. reflection amplitudes, distance values between reflective events, etc.) may be defined by design and be recorded as the expected values; previously characterized for each specific receive device 114 (e.g. at factory); or be determined by the OTDR device 112 via a prior calibration process during which an OTDR trace is acquired while the receive device 114 is connected to the launch device 112, without the link under test 110 (of course, if connectors do not match, the launch and receive devices 112, 114 may be interconnected via a jumper cable).

Figure 5:
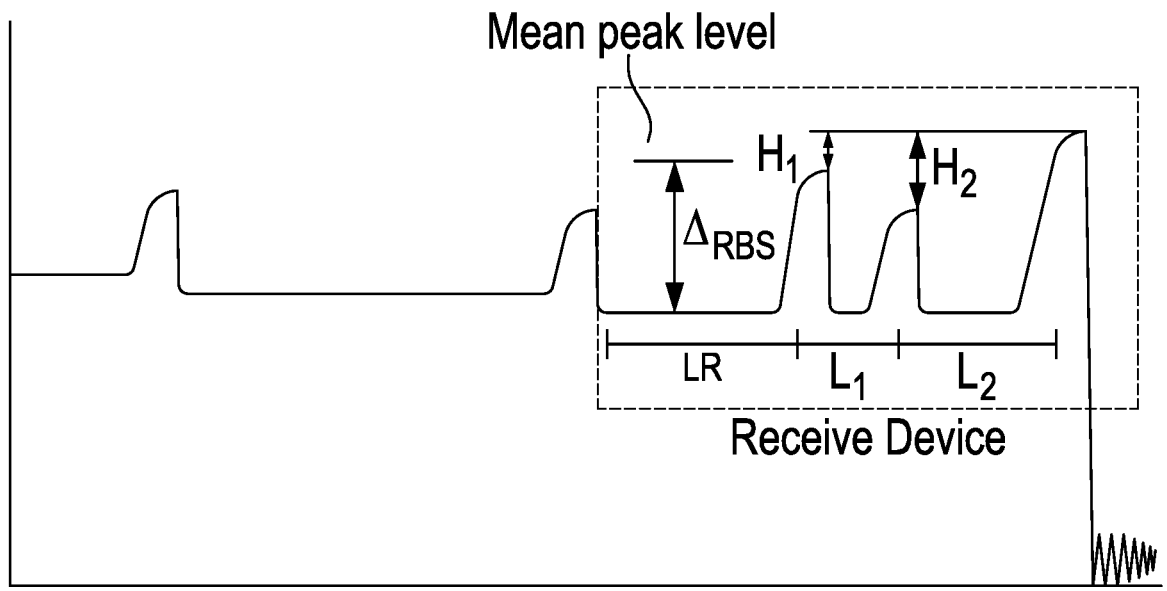
FIG. 5 is a graph showing an example of an OTDR trace as may be acquired with the OTDR test system of FIG. 1 and exhibiting signature pattern characteristics, in accordance with one embodiment.

FIG. 5 illustrates an example of an OTDR trace as may be acquired with the OTDR device 112 of the system of FIG. 1 and exhibiting signature pattern characteristics. For example, the signature pattern characteristics may comprise one or more of: a distance $L_R$ between the input connector interface 132 of the receive device 114 a first reflection peak, a distance L1 between a first and a second reflection peak, a distance L2 between a second and a third reflection peak, relative reflection levels H1 or H2 of reflection peaks relative to a reference peak, and a mean peak reflection amplitude $\Delta$RBS (or reflectance value) relative to the RBS level of a given fiber section for a normalized OTDR pulse.

Figures 6A, 6B:
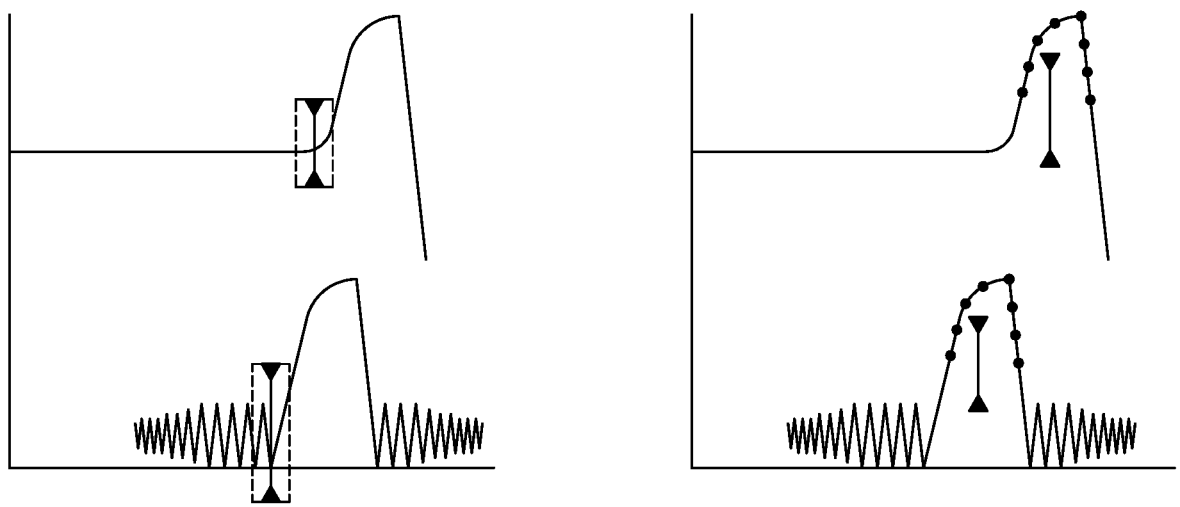
FIG. 6A is a graph showing an example of an OTDR trace which illustrates how the position of a reflection peak may be determined from the position of an edge of the peak, in accordance with one embodiment.
FIG. 6B is a graph showing an example of an OTDR trace which illustrates how the position of a reflection peak may be determined from a set of sample points acquired on a same peak, in accordance with another embodiment.

It will be understood that the signal processing algorithms used to determine positions of reflection peaks may vary. Referring to FIG. 6A, in one embodiment, the position of a reflection peak may be determined from the position of an edge of the peak. In another embodiment illustrated in FIG. 6B, the position of a reflection peak may be determined from a set of sample points acquired on a same peak. In yet another embodiment, it may be determined by the position of the maximum amplitude of the peak.

Optional Receive Device Calibration

As explained hereinabove, the one or more characteristics of each signature pattern (e.g. reflection amplitudes, distance values between reflection peaks, etc.) may be defined by design and recorded as the expected values; previously characterized for each specific receive device 114 (e.g. at factory); or be determined by the OTDR device 112 via a prior calibration process during which an OTDR trace is acquired while the receive device 114 is connected to the launch device 112, without the link under test 110.

For increased reliability of signature pattern recognition, one or more characteristics of each signature patterns may be previously characterized for each specific receive device 114 before the link under test 110 is connected to the OTDR device 112. For example, values of these characteristics can be measured at factory and stored on the receive device, in a non-volatile memory readable by the OTDR device 112 using wired, wireless communication, or encoded in a bar code such as a QR code readable via a camera on the OTDR device or another device with a code reader and which can transmit the read values to the OTDR device. 112, such as a smart phone.

Alternatively, values of these characteristics can be directly measured by the OTDR device 112 in a calibration process implemented in software, and which is completed before an OTDR measurement is performed towards the link under test 110.

If the characteristics relied upon are stable in time, once they are determined for a given receive device, they will not change in time and will remain valid indefinitely. The more the number of characteristics, the more distinct the signature patterns will be compared to other events that can be found along an arbitrary optical fiber link under test, which will increase detection robustness. For example, in one embodiment, one or two distance values are characterized and relied upon. In another embodiment, more distance values may be relied upon. In yet another embodiment, if the reflection amplitudes of the signature peaks are made stable enough, such characteristic can be relied upon in addition to distance values, which increase the distinctiveness of the signatures.

During the calibration process, a calibration OTDR acquisition is performed while the receive device 114 is connected to the launch device 112, without the link under test 110. An OTDR software is configured to detect the presence of a signature pattern in the OTDR trace, e.g., using its position along the OTDR trace or predetermined distinctive characteristics that are common to all possible signature patterns (within a given range of patterns determined by design). The OTDR software then derives values of at least one characteristic that can be used to recognize the signature pattern in measurement OTDR traces (when the link under test 110 is inserted) and, if signature patterns are unique, distinguish the signature patterns from one another (see hereinabove).

Other characteristics to be determined may comprise the position of one or more reflection peaks, which can be used thereafter to derive a position of the signature pattern in the measurement OTDR trace and derive therefrom a value of a total length of the optical fiber link under test.

Yet other characteristics may comprise a relative power level $\Delta Pc$ associated with one or more reflection peaks, relative to the RBS level of the launch fiber. Such value can be used thereafter to derive from the measurement OTDR trace a value of total insertion loss of the optical fiber link under test. The relative power level $\Delta Pc$ associated with each peak in the calibration OTDR trace corresponds to a zero total insertion loss (if ignoring the launch-receive connection). Alternatively, peak heights can be measured relative to the RBS level of the receive fiber in order to allow deriving a value of total insertion from peak heights in the measurement OTDR trace.

Figure 7A:
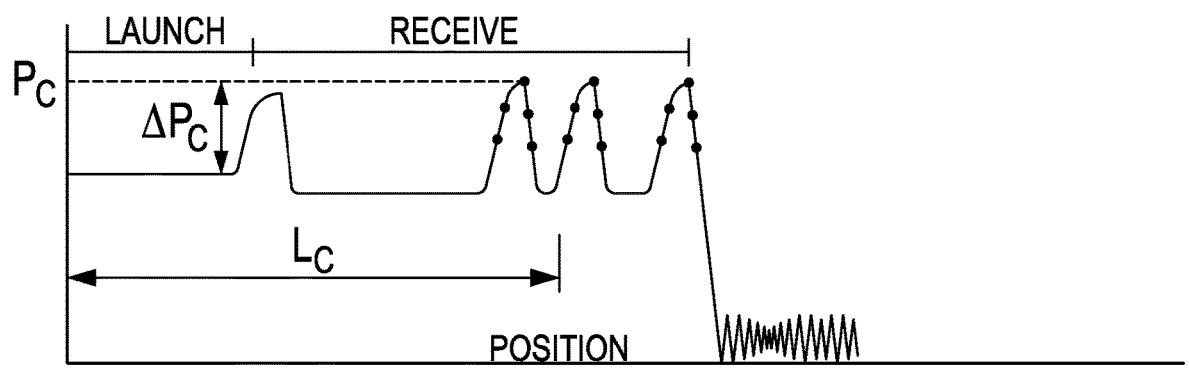
FIG. 7A is a graph showing an example of an OTDR trace which illustrates a calibration process, in accordance with one embodiment.

An example of an implementation of the calibration process is now described in more details with reference to FIG. 7A:

A) An OTDR acquisition is performed while the launch device 116 is connected to the OTDR device 110, without the link under test 110 and without the receive device 114, and the position of the end of the launch fiber is measured therefrom.

B) A calibration OTDR acquisition is performed while the launch device 116 and the receive device 114 are interconnected via their respective output connector interface 124 and input connector interface 132, without the link under test 110. The resultant calibration OTDR trace is illustrated in FIG. 7A.

C) From the calibration OTDR trace, the OTDR software identifies reflection peaks that form part of the signature pattern and derives therefrom values of characteristics of the signature pattern that can be relied upon thereafter to identify a signature pattern in a measurement OTDR trace. The derived characteristics also includes a position Lc of the signature pattern in the calibration OTDR trace. In one embodiment, the position Lc of the signature pattern may be defined by a position of one, such as the first, reflection peak. In another embodiment, the mean position Lc of multiple reflection peaks may be used. This later embodiment may improve the length measurement accuracy compared to the former. Yet other definitions may also be used.

In some embodiments including polarity detection, the derived characteristics may also to be relied upon to distinguish signature patterns from one another. In this case, more characteristics may be needed including, e.g., the position and reflection amplitude of individual peaks and/or relative reflection level amplitudes.

D) Optionally, for total insertion loss measurement, other derived characteristics derived from the calibration OTDR trace may comprise the relative power level $\Delta Pc$ associated with one or more reflection peaks of the signature pattern, relative, e.g., to the RBS level of the launch fiber. As explained herein above, such value can be used thereafter to derive a value of total insertion loss of the optical fiber link under test. Furthermore, the connection loss ILc between the launch device 116 and the receive device 114 may be derived using techniques known in the art.

E) Optionally, the calibration OTDR acquisition may further be used to validate the quality of the connections within the launch device 116 and the receive device 114, e.g. the connection between the optional replaceable launch fiber(s) 120 and the optical switch 118 and/or the connection between the receive fiber(s) 130 and the signed optical fiber path(s) 134, 136 (in order to ensure that the maximum measurement range of the system is available). The calibration OTDR acquisition may further be optionally used to validate the quality of the connection between the launch device 116 and the receive device 114.

It will be understood that in the case of duplex or multi-fiber array cable link under test, each step of the calibration process may need to be repeated for each optical fiber path of the link under test, i.e. using the optical switch 118.

Total Length Measurement

Some characteristics of the signature pattern(s) need to be determined before the following method is applied. As explained hereinabove, these characteristics may be defined by design and recorded as the expected values; previously characterized for each specific receive device 114 (e.g. at factory); or be determined by the OTDR device 112 via the calibration process described herein.

An OTDR method for characterizing the total length of the optical fiber link under test is now described with reference to FIG. 7B, which illustrates an example of a measurement OTDR trace:

A) An OTDR acquisition is performed while the link under test 110 is connected between the launch device 116 and the receive device 114. The resultant measurement OTDR trace is illustrated in FIG. 7B.

Because signature pattern detection and total link length measurement rely on high-intensity reflective peaks of the reflective optical signature, and not on RBS level, dynamic range constraints are relaxed and so is the averaging time. A single pre-set OTDR acquisition may therefore be employed, which provides fast and reliable link continuity verification and link length measurement. The pre-set OTDR acquisition parameters, including, e.g., the test signal pulse width, the test signal pulse repetition rate, the averaging number, the acquisition time and/or any other parameter that is being set by the OTDR for performing the OTDR acquisition, may be predetermined as a function of the OTDR device performance and properties of the signature pattern (distances and reflectance levels), so as to cover the maximum expected total insertion loss and total length of the link under test 110. Because signature pattern detection and total link length measurement rely on high-intensity reflective peaks of the reflective optical signature, and not on RBS level, suitable OTDR acquisition parameters can be determined without knowledge of the actual total length and the actual total insertion loss of the link under test 110.

B) From the measurement OTDR trace and known characteristics of the signature pattern(s), the OTDR software detects a signature pattern and derives a position Lm thereof in the measurement OTDR trace. Of course, the position definition should be consistent with that used in the calibration process or other prior characterization. As such, in one embodiment, the position Lm of the signature pattern may be defined by a position of one, such as the first, reflection peak. In another embodiment, the mean position Lm of multiple reflection peaks may be used.

C) From the derived position Lm, a value of the total length of the link under test 110 is derived as Ltot=Lm−Lc.

In this procedure, it is assumed that the same pulse width and the same receiver bandwidth is used for the calibration and measurement steps. Optionally, to support the use of different pulse widths and/or receiver bandwidths, one or more reference reflective features 128 may be introduced in the launch device 116 (see FIG. 2) and the position Lc, Lm of the signature pattern be determined relative to the reference reflective feature(s) 128.

Total Insertion Loss Measurement from Reflection Peaks

Figure 7B:
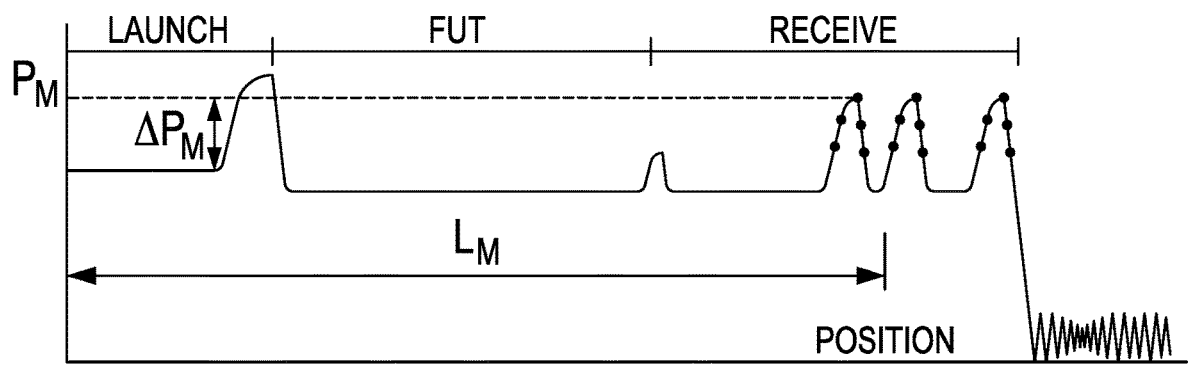
FIG. 7B is a graph showing an example of an OTDR trace which illustrates an OTDR method for characterizing the total length and total insertion loss of the optical fiber link under test, in accordance with one embodiment.

Referring to FIGS. 7A and 7B, the total insertion loss ILtot of the link under test 110 may further be measured or at least estimated from the reflection peaks of the signature pattern present in the above-described measurement OTDR trace and the calibration OTDR trace.

D) From the measurement OTDR trace, the relative power level ΔPm associated with one or more reflection peaks of the signature pattern is derived, relative, e.g., to the RBS level of the launch fiber.

E) From the derived relative power level ΔPm, a first value of the total insertion loss of the link under test 110 may be derived as:

ILtot=ΔPc−ΔPm, wherein ΔPc and ΔPm is calculated, e.g., as the difference between the power level associated with one or more reflection peaks of the signature pattern and the RBS level at the far end of the launch fiber. It will be understood that other definitions may be envisaged.

In fact, the total insertion loss ILtot derived as per the above equation corresponds to the difference in insertion loss between the measurement step and the calibration step. However, the insertion loss is not null in the calibration process and is biased by the connection loss ILc between the launch device 116 and the receive device 114. Optionally, if the connection loss ILc between the launch device 116 and the receive device 114 was determined in the calibration process, the first value of total insertion loss may be corrected to account for this bias and the first value of the total insertion loss be derived as:

ILtot=ΔPc−ΔPm+ILc.

If reflectance values of the reflection peaks are stable enough, the uncertainty associated with the total insertion loss ILtot obtained with this method can be suitable for Tier-1 testing.

It is noted that, alternatively, the relative power level ΔPc' may be defined relative to the RBS level of the receive fiber (and be obtained either from design values or a calibration process). Then, even if the noise is too high on the OTDR trace to measure the RBS level at the receive fiber, such RBS level can be derived from the peak power level of the reflection peak(s) Pm and the relative power level ΔPc':

RBSreceive=Pm−ΔPc'

Then, the total insertion loss ILtot can be derived from the RBS levels associated with the launch and receive fibers:

ILtot=RBSlaunch−RBSreceive

For improved measurement uncertainty, a second value of total insertion loss may be further or alternatively derived directly from the RBS level of the receive fiber as explained hereinbelow.

If a second measurement OTDR acquisition is required, e.g. for total insertion loss measurement, the total insertion loss ILtot as derived hereinabove may be used as one input parameter to select optimized OTDR acquisition parameters for such acquisition.

Total Insertion Loss Measurement from RBS Level

The properties and advantages of the signatures may be fully exploited to obtain fast and robust total insertion loss measurement.

As in the above-described method, some characteristics of the signature pattern(s) need to be determined before the following method is applied. These characteristics may be defined by design and recorded as the expected values; previously characterized for each specific receive device 114 (e.g. at factory); or be determined by the OTDR device 112 via the calibration process described herein.

An OTDR method of characterizing the total insertion loss of the optical fiber link under test is now described with reference to FIG. 7B, which shows an example of a measurement OTDR trace:

A) B) Steps A and B are conducted as described hereinabove.

C) The position of the receive fiber along the measurement OTDR trace may be determined from the position Lm of the signature pattern and a distance range where to measure the RBS level of the receive fiber be derived accordingly. The expected RBS power level of the receive fiber may also be derived from the power level of one or more reflection peaks and their expected peak heights.

D) If the Signal-to-Noise Ratio (SNR) associated with the RBS of the receive fiber over the distance range determined in C) is high enough, the total insertion loss ILtot of the link under test 110 is derived as known in the art from a difference between the RBS levels of the launch and receive fibers.

E) Otherwise, i.e. if the Signal-to-Noise Ratio (SNR) is too low (typically less than about 7 dB, in 5*LOG 10), a first value of total insertion loss ILtot1 is derived from the relative power level ΔPc or ΔPc' as described hereinabove.

F) Then, values of a second set of acquisition parameters are determined to derive a second value of total insertion loss ILtot. The second set acquisition parameters are selected to allow measurement of the RBS level associated with the receive fiber.

Using the determined total length Ltot and the first value of total insertion loss ILtot1, the OTDR software selects OTDR acquisition parameters that will provide a required SNR value to measure the RBS level on the receive fiber (typically 9 to 10 dB) within the shortest acquisition time. In other words, an OTDR acquisition may be performed using OTDR acquisition parameters that are selected to "optimally" characterize the RBS level associated with the fiber spool, i.e. in the shortest acquisition time.

The selected OTDR acquisition parameters for the second OTDR acquisition may comprise a pulse width, a pulse repetition period, an averaging number or an acquisition time, a wavelength, a receiver gain, a sampling resolution, an acquisition range (start/end) and/or any other parameter that is being set by the OTDR device for performing an OTDR acquisition. The OTDR acquisition parameters are selected as a function of the expected RBS level associated with the receive fiber spool as well as its distance from the OTDR, in order to minimize the acquisition time while providing a dynamic range suitable for assessing the RBS level.

G) A second OTDR acquisition is performed using the second set of acquisition parameters and a second value of total insertion loss ILtot is derived as known in the art using the RBS level associated with the receive fiber.

Measurement Speed and Signature Design

A fast and robust detection of the signature is beneficial to provide a quick feedback on the continuity between the OTDR device 112 and the receive device 114. It may also enable a quick determination of the location of the receive fiber in terms of distance and loss, to further perform total insertion loss measurement.

Figure 8A:
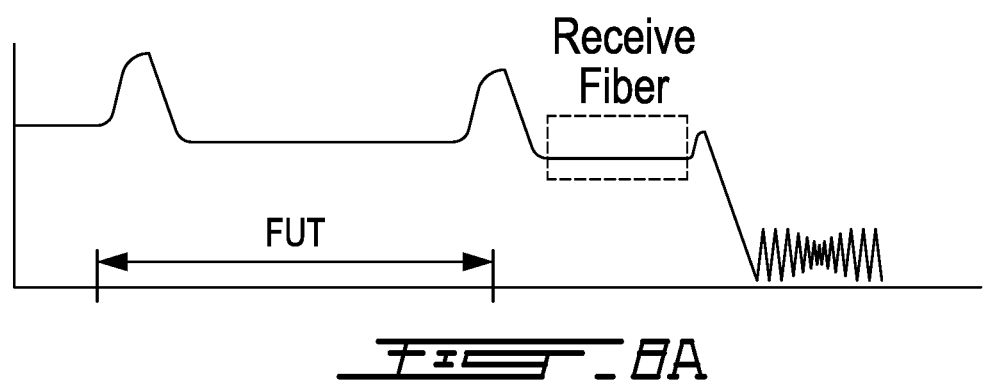
FIG. 8A is a graph showing an example of an OTDR trace which illustrates total length and total insertion loss measurement in the case of an unsigned receive device.
Figure 8B:
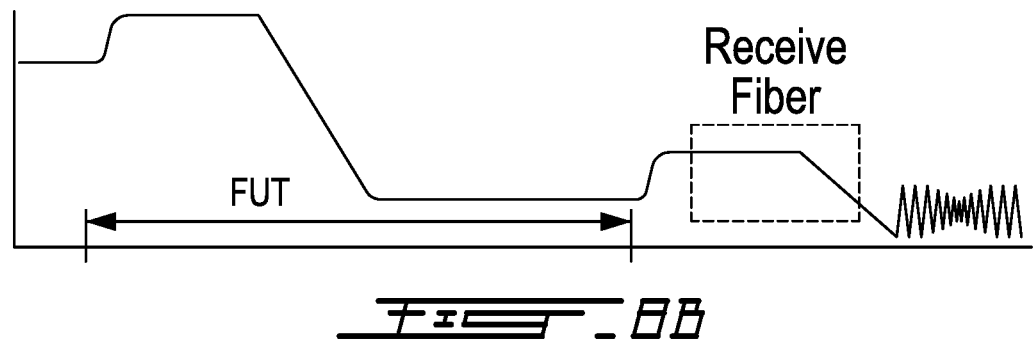
FIG. 8B is a graph showing an example of an OTDR trace which illustrates technical constraints arising when measuring total length and total insertion loss in the case of an unsigned receive device, in accordance with another embodiment wherein total insertion loss is high.

FIG. 8A illustrates total length and total insertion loss measurement in the case of an unsigned receive device. FIG. 8B illustrates technical constraints arising when measuring total length and total insertion loss in the case of an unsigned receive device and high total insertion loss.

Referring to FIGS. 8A and 8B, even if the detection of a plain receive fiber could be made acceptably robust to detect the end to end continuity of a fiber under test (based, e.g. on receive fiber length), there would remain important constraints on the detection conditions. More specifically and as shown in FIG. 8B, for higher link insertion loss, a higher dynamic range is required in order to acquire the RBS level associated with the receive fiber segment, which is essential to detect the receive device if no reflective optical signature is used. The dynamic range can be increased by increasing the averaging time, the pulse width or the receiver gain. Of course, increasing the averaging time will increase the detection time. On the other end, as shown in FIG. 8B, increasing the pulse width or the receiver gain reduces the spatial resolution by increasing the dead zone associated with a reflectance peak. As illustrated in FIG. 8B, a receive fiber spool that is too short may be hidden by the dead zone associated with the input connector reflectance peak when longer pulses and/or higher receiver bandwidths are used. Such measurement conditions will therefore require a longer receive fiber.

Figure 9A:
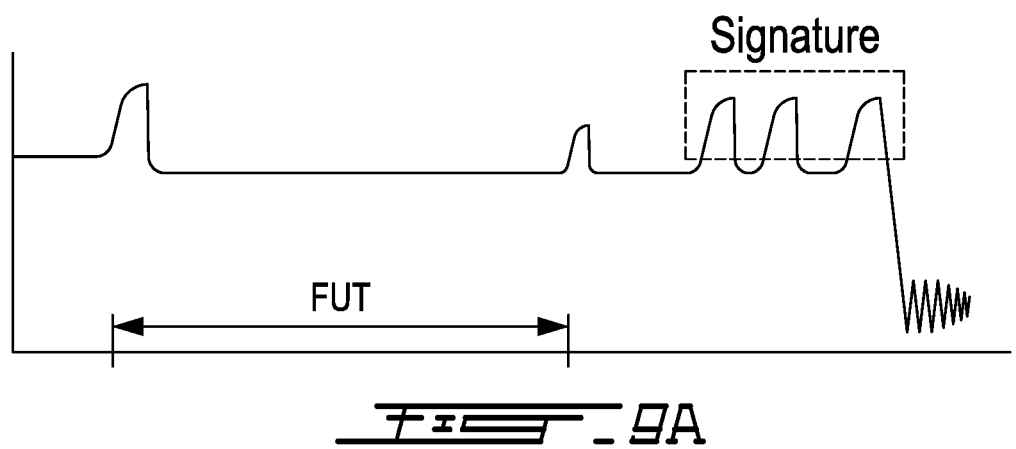
FIG. 9A is a graph showing an example of an OTDR trace which illustrates total length and total insertion loss measurement in the case of a signed receive device, in accordance with one embodiment.
Figure 9B:
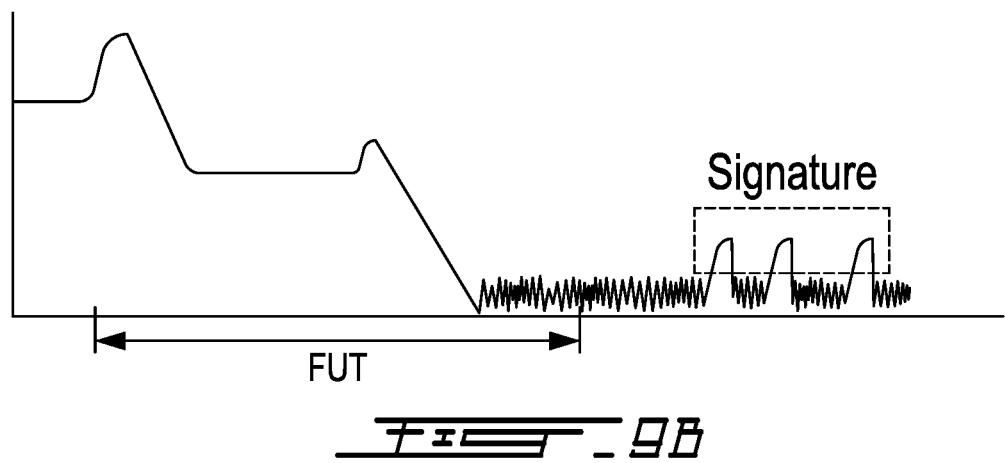
FIG. 9B is a graph showing an example of an OTDR trace which illustrates total length and total insertion loss measurement in the case of a signed receive device, in accordance with another embodiment wherein total insertion loss is high.

In contrast, FIGS. 9A and 9B illustrates the case of a signed receive device. Referring to FIGS. 9A and 9B, a reflective optical signature built from reflection peaks is easier and faster to detect on an OTDR trace even if the dynamic range requirements are relaxed. More specifically, contrarily to fiber RBS, the strength of the backreflected signal caused by reflection peaks do not decrease when using shorter pulse widths. Thus, a signature can be built with short fiber lengths and, as illustrated in FIG. 9B, can still be made detectable with a small averaging time and short pulses, even in the case of high link insertion loss.

Detecting a signature pattern quickly and robustly is much more straightforward than standard event detection on OTDR trace. For example, instead of trying to identify events without any clues, a signature detection algorithm may search for a precise pattern in the acquired OTDR trace, allowing a fast single-pass process.

Figure 10A:
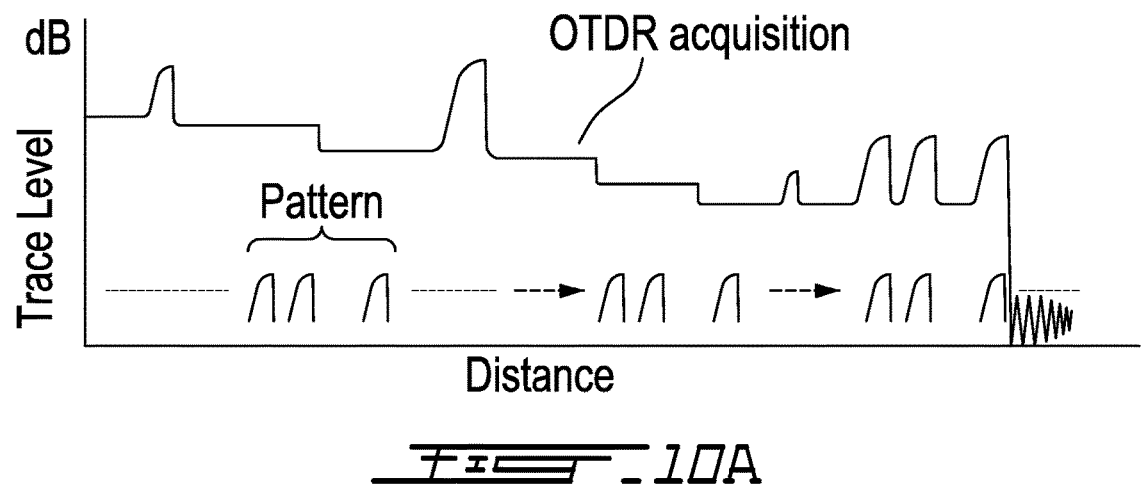
FIG. 10A is a graph showing an example of an OTDR trace which illustrates a signature detection algorithm, in accordance with one embodiment that is based on cross-correlation.

Now referring to FIG. 10, a detection algorithm is described in accordance with one embodiment based on cross-correlation. The position of the signature pattern is derived by comparing the acquired OTDR trace to an expected signature pattern function. For example, the expected signature pattern function may be built from known characteristics of the signature pattern such as the expected distance between reflection peaks and the expected relative amplitude between the reflection peaks.

In one embodiment, the expected signature pattern function is obtained by extracting a segment from the calibration OTDR trace, which is representative of the signature pattern, i.e. an OTDR trace segment containing the signature peaks.

Figure 10B:
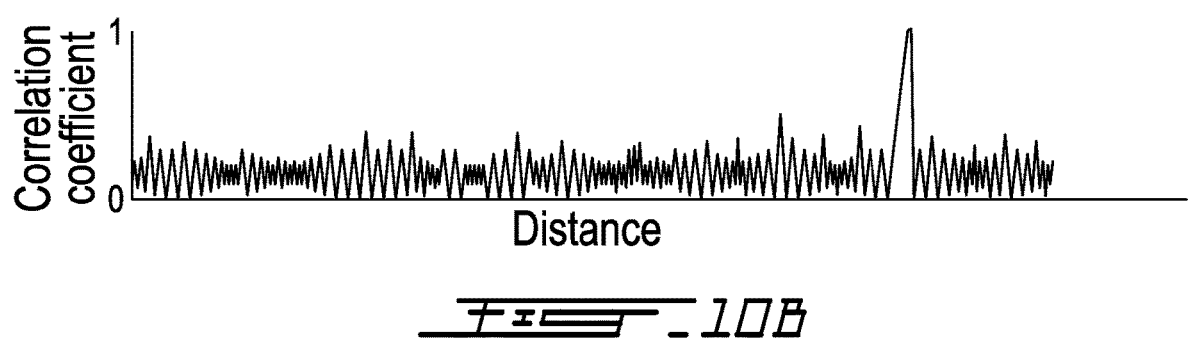
FIG. 10B is a graph showing the correlation coefficient as a function of distance as obtained with the OTDR trace of FIG. 10A.

The expected pattern function may then be moved along the acquired OTDR trace to compute a cross-correlation between the expected signature pattern function and the acquired OTDR trace for multiple positions along the OTDR trace. As shown in FIG. 10B, when the expected signature pattern function is well aligned with the signature pattern, the cross-correlation coefficient reaches a maximum value that is above a predefined threshold. A total length of the link under test can be derived from the position of the maximum value of cross-correlation coefficient.

Of course, other 2D shape recognition algorithms can be used.

Figure 11:
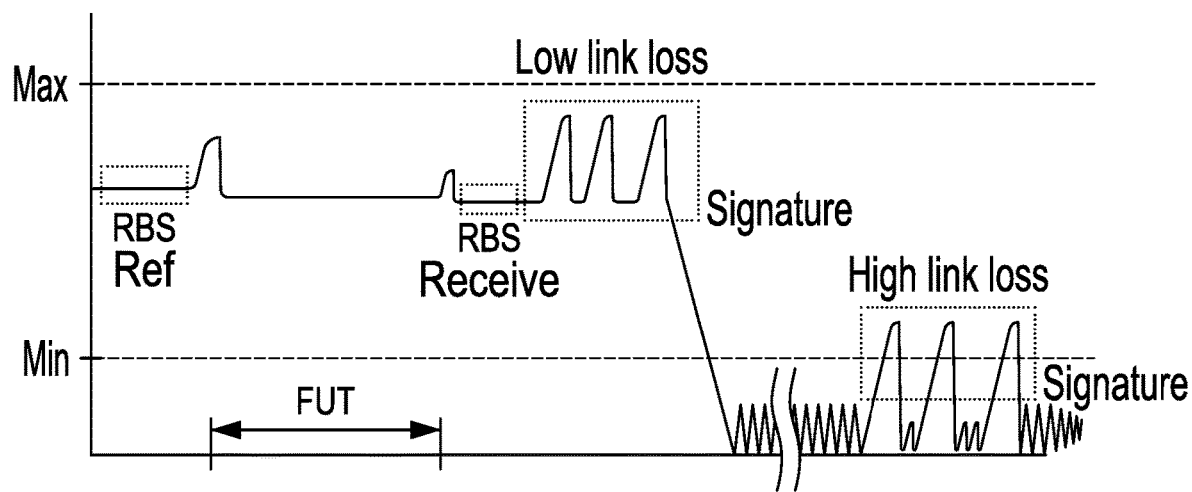
FIG. 11 is a graph illustrating design constraints of the reflective signature pattern, in accordance with one embodiment.

Referring to FIG. 11, the reflective signature pattern may be design in accordance with the following considerations:

A) Define the maximum total insertion loss and total length compliance of the signature pattern.

B) For a maximum accuracy, the level of the reference element (i.e. receive fiber RBS or reflection peak) and the reflection peaks should be within a range defined at the top by the saturation level of the OTDR device and at the bottom by the minimum signal-to-noise ratio of a single OTDR acquisition, over the maximum supported link insertion loss.

C) For an extended link insertion loss range, it is possible to use stronger reflection peaks in the signature pattern and use a multi-pulse OTDR measurement for total length measurement. More specifically, a constructed OTDR trace may be derived by combining multiple OTDR traces acquired with varied pulse widths or receiver bandwidths, in order to extend the measurement dynamic range (see, e.g. U.S. Pat. No. 5,155,439 to Holmbo et al. and U.S. Pat. No. 5,528,356 to Harcourt).

A larger number of reflection peaks in the signature pattern will improve its unicity and the robustness of the detection, as well as length measurement and loss estimation accuracy.

The more the number of characteristics, the more distinct the signature patterns will be compared to other events that can be found along an arbitrary optical fiber link under test, which will increase detection robustness. For example, a greater number of reflection peaks in the signature pattern will increase detection robustness. It may further improve total length and total insertion loss measurement accuracy by averaging values among the reflection peaks.

Multifiber and Loopback Measurements

Figure 12:
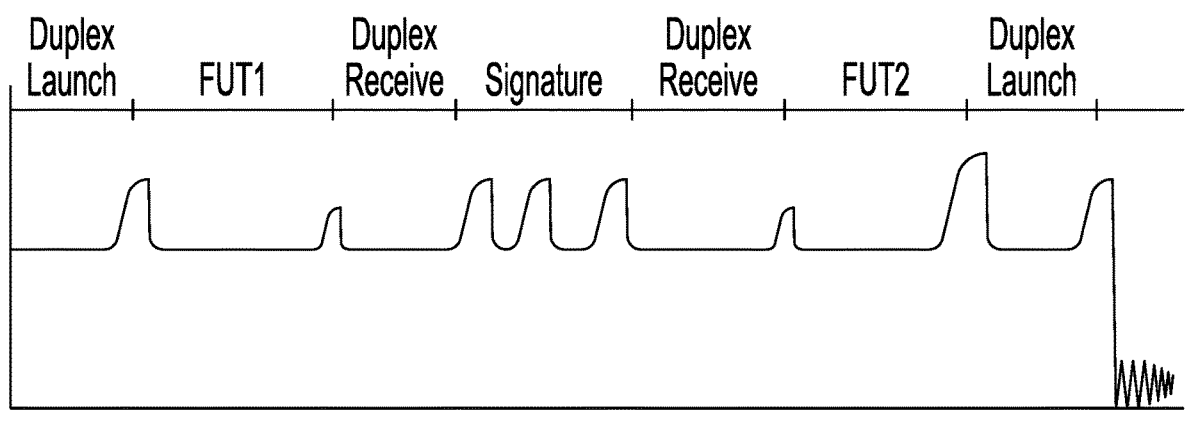
FIG. 12 is a graph showing an example of an OTDR trace acquired with the OTDR test system of FIG. 1 and exhibiting signature pattern characteristics, in accordance with another embodiment employing the loopback receive device of FIG. 4.

Referring to FIGS. 4 and 12, in case of duplex or multi-fiber array cable links under test, a receive device 114 comprising loopbacks can be used. The calibration and measurement process described hereinabove applies in the same manner. As shown in FIG. 12, because the link under test, as well as the length of the launch and receive fibers are the same on two fiber links that are looped back together, once the signature pattern is detected, the position of both launch fibers and both receive fibers can be automatically determined from known characteristics of the signature pattern.

Real-Time Meter

Because the measurement can be made fast, the measurement process can be repeated in a continuous manner to provide continually updated values of total length, total ORL and/or total insertion loss, similarly to a power meter that updates the power value few times per seconds. Accordingly, in one embodiment, total insertion loss and total length measurements are repeated in a continuous manner and are stored upon request by the user who can simply hit "store" when he or she is satisfied with the results. This way, there is no need for the user to start an acquisition. The acquisition automatically runs continuously, and results are made automatically available as soon as the OTDR device, the launch device and the receive device are connected to a link under test. Results are stored on demand.

RBS Bias Correction

A problem with single-end OTDR measurements is the determination of insertion loss in cases where the link under test includes a concatenation of optical fibers. Small differences in fiber geometry between the different fiber segments induce small changes in the backscattering characteristics. This geometry mismatch between spliced fibers may cause an apparent "gain" or a drop in the backscattered light of OTDR measurements, which introduces a bias in the insertion loss measurement. For this reason, the Telecommunications Industry Association (TIA) recommends the use of bi-directional OTDR analysis to average the results of single-ended OTDR measurements and properly characterize multi-fiber links (test procedure EIA/TIA FOTP-61 "Measurement of Fiber or Cable Attenuation Using an OTDR").

Backscattering characteristics are directly influenced by geometric factors such as core diameter, numerical aperture and index profile for example. Variability in geometric factors can be large when different types of fibers are connected together. However, even when all fiber segments are of the same fiber type, small geometric mismatches still may exist due to fiber manufacturing tolerances.

U.S. Pat. No. 9,709,460 to Leblanc et al. (commonly owned by the Applicant and hereby incorporated by reference) describes a single-ended OTDR measurement technique which allow optical loss measurements of an optical fiber link formed by one or more lengths (also referred to herein as segments or portions) of optical fiber serially connected to each other, and wherein the optical loss measurement is free from a bias associated with varying backscattering characteristics along the optical fiber link. By obtaining a bias value indicative of differing backscattering characteristics of a launch fiber and of a receive fiber (obtained via a prior calibration), a biased optical loss value measured on a single-ended OTDR trace can be adjusted to obtain the actual optical loss value.

The method of U.S. Pat. No. 9,709,460 calibrates a pair of launch and receive fibers in an initial bidirectional OTDR measurement to determine a correction factor (RBS mismatch factor) to be applied on future single-ended OTDR measurements, in order to obtain an optical loss measurement that is free of from a bias associated with varying backscattering characteristics and which is then equivalent to an optical loss measurement as would be obtained using a bidirectional OTDR measurement.

A problem in implementing the RBS correction method of U.S. Pat. No. 9,709,460 in the context of multi-fiber array cables of varying polarity arrangements is that the polarity arrangement is not known a priori. As such, among the multiple fibers of the launch and receiver fiber spools, the exact pair of launch and receive fibers that are connected to a given optical fiber path of the multi-fiber array cable link during the test may vary and is a priori unknown. The bias induced by differing backscattering characteristics is specific to each pair of launch and receive fibers. Accordingly, the bias associated with each possible pair of launch and receive fibers should be characterized or derived in order to properly apply the RBS correction method. Furthermore, because the polarity arrangement is not known a priori, the actual pair of launch and receive fibers associated with the fiber path being characterized should be identified in order to apply the relevant bias.

The following method solves this problem by a calibration step of the multi-fiber launch and receive devices which is used to derive RBS biases associated with every possible pair of launch and receive fibers. The relevant RBS bias to be applied is determined by:

- detecting the signature pattern in the measurement OTDR trace;
- from the detected signature patterns, identifying which launch and receive fiber pair is connected;
- applying the RBS bias associated with the identified launch and receive fiber pair.

Figure 13A:
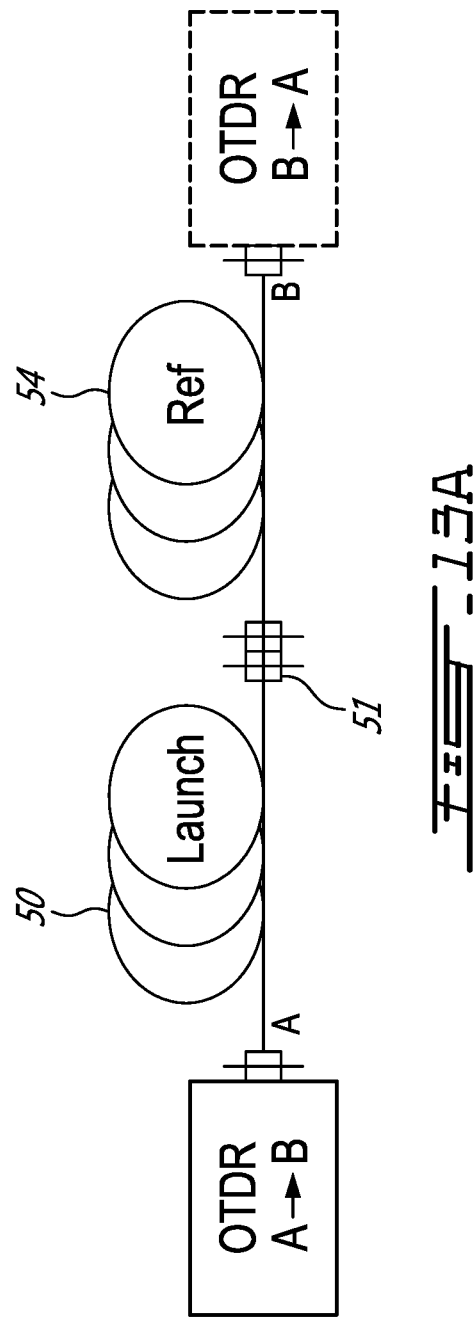
FIG. 13A is a block diagram illustrating a bidirectional OTDR measurement made on a launch fiber that is connected to a reference fiber.
Figure 13B:
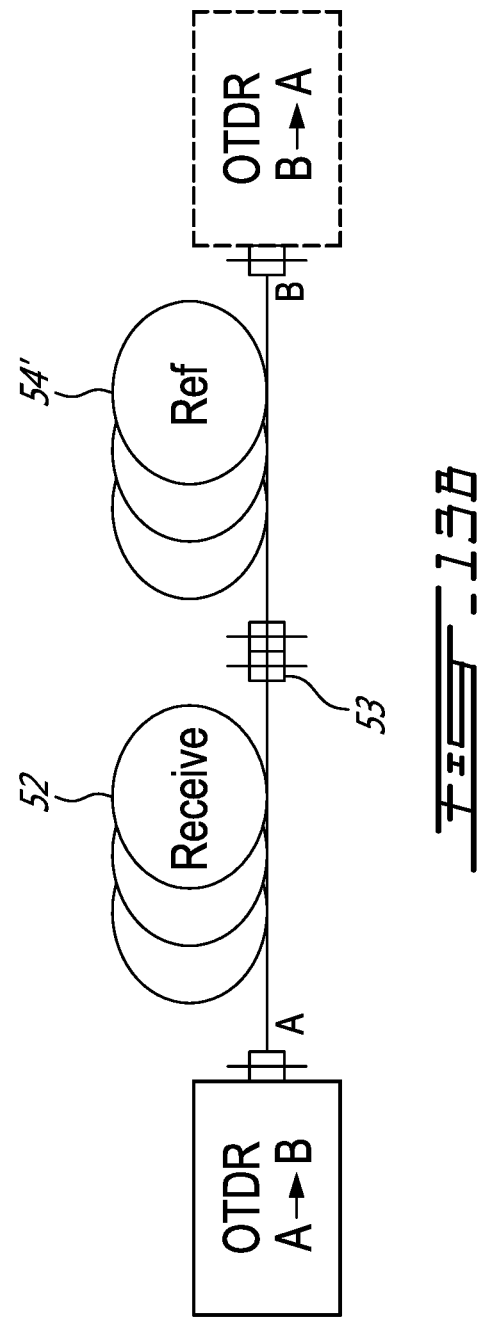
FIG. 13B is a block diagram illustrating a bidirectional OTDR measurement made on a reference fiber that is connected to a receive fiber.

Referring to FIGS. 13A and 13B, a reference method is described, which determines relative bias values associated with each launch and receive fibers for subsequent correction of the optical loss measurements. A relative RBS bias value (RBV), i.e. relative to an arbitrary reference fiber, is measured for each launch and receive fibers of the launch and receive devices. Referring specifically to FIG. 13A, for a connection between a launch fiber 50 and a first reference fiber 54, forward and backward connection loss values $CLV_{A \to B}$ and $CLV_{B \to A}$ can be obtained, which are used to calculate a first relative bias value $RBV_L$ between the launch fiber 50 and the first reference fiber 54. The operation may be repeated for each launch fiber of the launch device. Now referring to FIG. 13B, for a connection between a receive fiber 52 and a second reference fiber 54' (which may or may not be the same as the first reference fiber 54), forward and backward connection loss values $CLV_{A \to B}$ and $CLV_{B \to A}$ can be obtained. These values are used to calculate a second relative bias value $RBV_R$ between the receive fiber 52 and the second reference fiber 54'. The operation may be repeated for each receive fiber of the receive device. The determined relative bias values associated with each launch and receive fibers are saved in memory for subsequent correction of the optical loss measurements. During the same operation, values of characteristics of the signature pattern associated with each receive fiber 52 of the receive device can be derived from the OTDR measurement and be saved in memory in such a way that signature characteristic values of each fiber path of the receive device are associated with the corresponding relative bias value.

The total bias value corresponding to any pair of launch and receive fibers 50, 52 can then be obtained by subtracting the first and second relative bias values:

$$BV = RBV_L - RBV_R$$

It will be readily understood that the first and the second reference fibers 54 and 54' can be the exact same reference fiber, can be cut from a common spool of reference optical fiber, from two different spools of the same reference optical fiber and two different spools of two reference optical fibers, provided that the first and the second reference fibers 54 and 54' have the same backscattering characteristics within an accepted tolerance. With reference fibers having matching backscattering characteristics, the bias introduced is null. Henceforth, these reference fibers are suitable for the calibration of pairs of launch and receive fibers.

One skilled in the art will appreciate that the bias value for a given pair of launch and receive fibers, as well as relative bias values, are not expected to vary over time. Indeed, the geometry or the backscattering characteristics of the two fibers do not change significantly with time. Accordingly, one may only need to calibrate each launch and receive fiber spool(s) once, for instance "at the factory", in order to perform optical loss measurement using a single-ended OTDR trace for an indefinite time period. Of course, the calibration may also be performed at the test site or anywhere else.

In one embodiment, the relative bias values and the signature characteristic values may be saved in the OTDR device used for the calibration, if the same OTDR device is to be used for the optical loss measurement. Alternatively, the relative bias values and the signature characteristics may be saved in a portable memory or in a remote location accessible via a network. In another embodiment that may be convenient for in-factory RBS bias calibration, the relative bias values and the signature characteristic values are saved in non-volatile memory devices located within the launch and receive devices. The relative bias values associated with the launch fibers may be saved in a non-volatile memory located in the launch device and the relative bias values associated with the receive fibers as well as the signature characteristic values may be saved in a non-volatile memory located in the receive device. For example, these values may be uploaded to the OTDR device via a temporary wired or wireless connection.

Once the relative bias values and the signature characteristic values are determined and made available to the OTDR device or OTDR analysis software, an optical loss measurement may be performed by connecting the multi-fiber array cable link under test between the launch device and the receive device (see FIG. 1).

In accordance with one embodiment, an optical loss measurement method is performed as follows. For each fiber path of the multi-fiber array cable link under test:

A) An OTDR measurement is launched towards the fiber path via the optical switch and the corresponding OTDR trace(s) is(are) recorded;

B) A signature of the receive device for the given fiber path is detected in the OTDR trace(s) and signature characteristic values are derived;

C) From the signature characteristic values, the relative bias value associated with the relevant receive fiber is retrieved;

D) The relevant launch fiber is known from the optical fiber port of the optical switch towards which test light is being launched, and the relative bias value associated with relevant launch fiber is retrieved accordingly;

E) The total bias value corresponding to the pair of launch and receive fibers is derived from the relative bias values;

F) The optical loss associated with the fiber path is determined from the OTDR trace(s) for which the RBS bias is corrected using the determined total bias value correction.

More specifically, the OTDR trace A→B shows the return signal as a function of distance, wherein portions of the return signal can be associated respectively with the launch fiber, an optical fiber path of the multi-fiber array cable link under test and the receive fiber.

As known in the art, a preliminary optical loss value POLV value associated with a given fiber path of the multi-fiber array cable link under test can be measured by the difference between a first return light signal level at a connection between the launch fiber and the multi-fiber array cable link under test and a second return light signal level at the connection between the multi-fiber array cable link under test and the receive fiber. Such a POLV value includes the loss due to these two connections.

To derive the optical loss value that is free from the bias introduced by varying backscattering characteristics among the optical fibers of the optical fiber path, one may subtract the calculated bias value BV from the preliminary optical loss value POLV of the fiber path:

$$OLV = POLV - BV.$$

Example of OTDR Device Architecture

Figure 14:
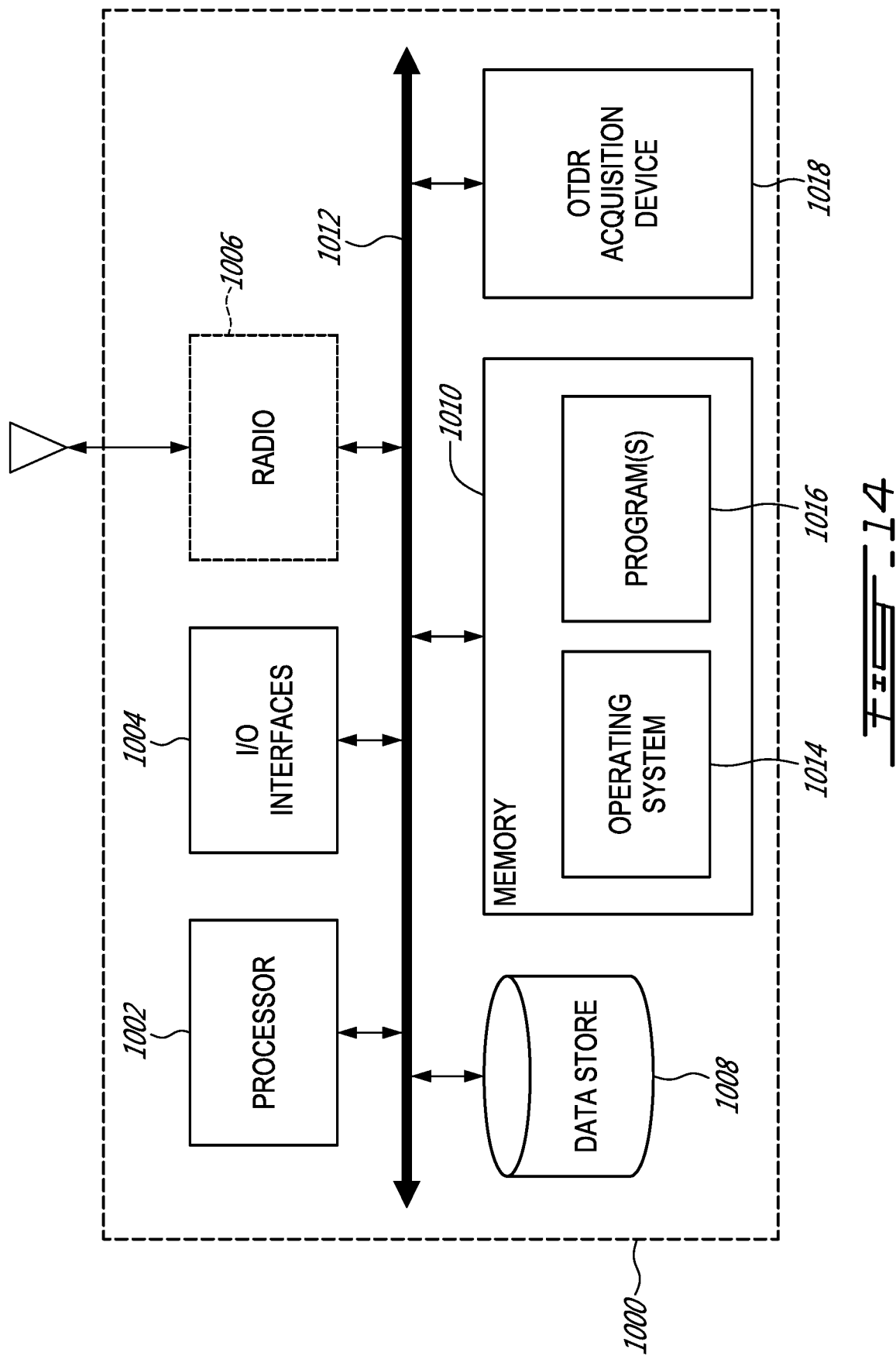
FIG. 14 is a block diagram illustrating an example architecture of an OTDR device of the system of FIG. 1.

FIG. 14 is a block diagram of an OTDR device 1000 which may embody the OTDR method described herein. The OTDR device 1000 may comprise a digital device that, in terms of hardware architecture, generally includes a processor 1002, input/output (I/O) interfaces 1004, an optional radio 1006, a data store 1008, a memory 1010, as well as an optical test device including an OTDR acquisition device 1018. It should be appreciated by those of ordinary skill in the art that FIG. 14 depicts the OTDR device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the OTDR device 1000 is in operation, the processor 1002 is configured to execute software stored within the memory 1010, to communicate data to and from the memory 1010, and to generally control operations of the OTDR device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the OTDR device 1000 and/or output at least one of the values derived by the OTDR analyzing module.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OTDR traces and OTDR measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 14, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the OTDR device 1000. For example, example programs 1016 may include a web browser to connect with a server for transferring OTDR measurement data files, a dedicated OTDR application software configured to determine OTDR acquisitions by the OTDR acquisition device 1018, set OTDR acquisition parameters, analyze OTDR traces obtained by the OTDR acquisition device 1018 and display a GUI related to the OTDR device 1000. For example, the dedicated OTDR application and/or program(s) 1016 may embody the OTDR analysis module 114, configured to analyze acquired OTDR traces in order to characterize the optical fiber link under test, and produce OTDR measurement data files.

The dedicated OTDR application and/or program(s) 1016 may embody an OTDR analyzing module configured for detecting, in the OTDR acquisition, a signature pattern corresponding to the reflective optical signature to derive a position thereof, and deriving a value of a total length of the optical fiber link under test using the derived position and/or a value of a total insertion loss of the link under test from a relative power level of at least one reflectance peak of the reflective optical signature or from the RBS level of a fiber section selected upstream from the reflectance peaks. In one embodiment, the OTDR analyzing module may be configured to perform steps of any one of the methods described herein.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the OTDR device 1000 via the radio 106. In such cases, at least some of the programs 1016 may be located in a memory of such a mobile device, for execution by a processor of the physically distinct device. The mobile may then also include a radio and be used to transfer OTDR measurement data files toward a remote test application residing, e.g., on a server.

It should be noted that the OTDR device shown in FIG. 14 is meant as an illustrative example only. Numerous types of computer systems are available and can be used to implement the OTDR device.

Example of OTDR Acquisition Device Architecture

FIG. 15 is a block diagram an embodiment of an OTDR acquisition device 1050 which may embody the OTDR acquisition device 1018 of the OTDR device 1000 of FIG. 14.

The OTDR acquisition device 1050 is connectable toward the tested optical fiber link via an output interface 1064, for performing OTDR acquisitions toward the optical fiber link. The OTDR acquisition device 1050 comprises conventional optical hardware and electronics as known in the art for performing OTDR acquisitions over an optical fiber link.

The OTDR acquisition device 1050 comprises a light generating assembly 1054, a detection assembly 1056, a directional coupler 1058, as well as a controller 1070 and a data store 1072.

The light generating assembly 1054 is embodied by a laser source 1060 driven by a pulse generator 1062 to generate the OTDR test signal comprising test light pulses having desired characteristics. As known in the art, the light generating assembly 1054 is adapted to generate test light pulses of varied pulse widths, repetition periods and optical power through a proper control of the pattern produced by the pulse generator 1062. One skilled in the art will understand that it may be beneficial or required by the application to perform OTDR measurements at various different wavelengths. For this purpose, in some embodiments, the light generating assembly 1054 is adapted to generate test light pulses having varied wavelengths by employing a laser source 1060 that is tunable for example. It will be understood that the light generating assembly 1054 may combine both pulse width and wavelength control capabilities. Of course, different and/or additional components may be provided in the light generating assembly, such as modulators, lenses, mirrors, optical filters, wavelength selectors and the like.

The light generating assembly 1054 is coupled to the output interface 1064 of the OTDR acquisition device 1050 through a directional coupler 1058, such as a circulator, having three or more ports. The first port is connected to the light generating assembly 1054 to receive the test light pulses therefrom. The second port is connected toward the output interface 1064. The third port is connected to the detection assembly 1056. The connections are such that test light pulses generated by the light generating assembly 1054 are coupled to the output interface 1064 and that the return light signal arising from backscattering and reflections along the optical fiber link 110 is coupled to the detection assembly 1056.

The detection assembly 1056 comprises a light detector 1066, such as a photodiode, an avalanche photodiode or any other suitable photodetector, which detects the return light signal corresponding to each test light pulse, and an analog to digital converter 1068 to convert the electrical signal proportional to the detected return light signal from analog to digital in order to allow data storage and processing. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

Of course, the OTDR acquisition device 1050 may also be used to perform multiple acquisitions with varied pulse widths to obtain a multi-pulsewidth OTDR measurement.

The OTDR acquisition device 1050, and more specifically the light generating assembly 1054 is controlled by the controller 1070. The controller 1070 is a hardware logic device. It may comprise one or more Field Programmable Gate Array (FPGA); one or more Application Specific Integrated Circuits (ASICs) or one or more processors, configured with a logic state machine or stored program instructions. When the OTDR acquisition device 1050 is in operation, the controller 1070 is configured to control the OTDR measurement process. The controller 1070 controls parameters of the light generating assembly 1054 according to OTDR acquisition parameters that are either provided by the operator of the OTDR software or otherwise determined by program(s) 1016.

The data store 1072 may be used to cumulate raw data received from the detection assembly 1056, as well as intermediary averaged results and resulting OTDR traces. The data store 1008 may include any of volatile memory elements (e.g., random access memory (RAM, such as DRAM, SRAM, SDRAM, and the like)) or the like and it may be embedded with the controller 1070 or distinct.

The OTDR traces acquired by the OTDR acquisition device 1050 may be received and analyzed by one or more of the computer programs 1016 and/or stored in data store 1008 for further processing.

It should be noted that the architecture of the OTDR acquisition device 1050 as shown in FIG. 15 is meant as an illustrative example only. Numerous types of optical and electronic components are available and can be used to implement the OTDR acquisition device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The embodiments described above are intended to be exemplary only. The scope of the invention is therefore intended to be limited solely by the appended claims.

The invention claimed is:

1. An OTDR method for characterizing an optical fiber link under test connected at a remote end to a receive device comprising a reflective optical signature and a receive fiber, the OTDR method comprising:
    performing at least a first OTDR acquisition toward the optical fiber link, wherein each OTDR acquisition is performed by propagating in the optical fiber link under test, a test signal corresponding to a first set of acquisition parameters and detecting corresponding return light signal from the optical fiber link so as to obtain an OTDR trace representing backscattered and reflected light as a function of distance in the optical fiber link;
    in the acquired OTDR trace, detecting a signature pattern corresponding to said reflective optical signature to derive a position thereof;
    deriving a first value of the total insertion loss of the link under test, at least from a relative power level of at least one reflectance peak of the signature pattern;
    determining values of a second set of acquisition parameters at least as a function of the derived first value of the total insertion loss and the derived position of the reflective optical signature;
    performing a second OTDR acquisition toward the optical fiber link using the second set of acquisition parameters to obtain a second OTDR trace wherein the Rayleigh Backscattering level associated with the receive fiber is measurable; and
    deriving a second value of the total insertion loss of the link under test from said second OTDR trace.

2. The method as claimed in claim 1, wherein a Rayleigh Backscattering level associated with the receive fiber is not measurable in the acquired OTDR trace.

3. The method as claimed in claim 1, further comprising performing a calibration OTDR acquisition towards the receive device without the link under test.

4. The method as claimed in claim 1, wherein the first set of acquisition parameters are pre-set independently of the actual total length and the actual total insertion loss of the link under test.

5. The method as claimed in claim 1, further comprising repeating OTDR acquisitions and deriving values of total length and total insertion loss of the link under test in a continuous manner and storing values of total length and total insertion loss upon request by the user.

6. The method as claimed in claim 1, further comprising deriving a value of a total length of the optical fiber link under test using the derived position.

7. An OTDR method for characterizing an optical fiber link under test connected at a remote end to a receive device comprising a reflective optical signature and a receive fiber, the OTDR method comprising:

performing at least a first OTDR acquisition toward the optical fiber link wherein each OTDR acquisition is performed by propagating in the optical fiber link under test, a test signal corresponding to a first set of acquisition parameters and detecting corresponding return light signal from the optical fiber link so as to obtain an OTDR trace representing backscattered and reflected light as a function of distance in the optical fiber link;

in the acquired OTDR trace, detecting a signature pattern corresponding to said reflective optical signature to derive a position thereof;

deriving a distance range where to measure a Rayleigh Backscattering level of the receive fiber, from the derived position of the reflective optical signature; and deriving a value of the total insertion loss of the link under test, from the Rayleigh Backscattering level within the derived distance range.

8. The method as claimed in claim 7, further comprising deriving a value of a total length of the optical fiber link under test using the derived position.

9. An OTDR method for characterizing an optical fiber link under test connected at a remote end to a receive device comprising a reflective optical signature and a receive fiber, the OTDR method comprising:

performing at least a first OTDR acquisition toward the optical fiber link, wherein each OTDR acquisition is performed by propagating in the optical fiber link under test, a test signal corresponding to a first set of acquisition parameters and detecting corresponding return light signal from the optical fiber link so as to obtain an OTDR trace representing backscattered and reflected light as a function of distance in the optical fiber link;

in the acquired OTDR trace, detecting a signature pattern corresponding to said reflective optical signature to derive a position thereof; and deriving a value of a total length of the optical fiber link under test using the derived position;

wherein the position of the signature pattern is derived by comparing the acquired OTDR trace to a segment that is extracted from a calibration OTDR acquisition and that is representative of the signature pattern, the calibration OTDR acquisition being performed towards the receive device without the link under test.

10. The method as claimed in claim 9, wherein said comparing comprises calculating a cross-correlation between said segment and said acquired OTDR trace.

11. The method as claimed in claim 10, further comprising performing the calibration OTDR acquisition towards the receiver device without the link under test and extracting said segment from the calibration OTDR acquisition.

12. An OTDR method for characterizing a total length of an optical fiber link under test connected at a remote end to a receive device comprising a reflecting optical signature and a receive fiber, the OTDR method comprising:

performing at least a first OTDR acquisition toward the optical fiber link, wherein each OTDR acquisition is performed by propagating in the optical fiber link under test, a test signal corresponding to a first set of acquisition parameters and detecting corresponding return light signal from the optical fiber link so as to obtain an OTDR trace representing backscattered and reflected light as a function of distance in the optical fiber link;

in the acquired OTDR trace, detecting a signature pattern corresponding to said reflective optical signature to derive a position thereof;

deriving a value of a total length of the optical fiber link under test using the derived position;

wherein said optical fiber link under test is a multi-fiber array cable link and wherein the receive device comprises reflective optical signatures, and wherein said method further comprises:

performing at least a first OTDR acquisition toward at least one optical fiber path of the multi-fiber array cable link;

in the acquired OTDR trace, detecting a signature pattern corresponding to a corresponding one of the reflective optical signatures; and determining a polarity of the said multi-fiber array cable link from the detected signature pattern.

13. An OTDR device for characterizing an optical fiber link under test connected at a remote end to a receive device comprising a reflective optical signature and a receive fiber, the OTDR device comprising:

an OTDR acquisition device connectable toward an end of the optical fiber link for performing at least a first OTDR acquisition toward the optical fiber link, wherein each OTDR acquisition is performed by propagating in the optical fiber link under test, a test signal corresponding to a set of acquisition parameters and detecting corresponding return light from the optical fiber link so as to obtain an OTDR trace representing backscattered and reflected light as a function of distance in the optical fiber link; and a processing unit receiving the acquired OTDR trace and configured for:

in the acquired OTDR trace, detecting a signature pattern corresponding to said reflective optical signature to derive a position thereof; and deriving a first value of the total insertion loss of the link under test at least from a relative power level of at least one reflectance peak of the signature pattern determining values of a second set of acquisition parameters at least as a function of the derived first value of the total insertion loss and the derived position of the reflective optical signature;

deriving a second value of the total insertion loss of the link under test from a second OTDR trace performed toward the optical fiber link using the second set of acquisition parameters, wherein the Rayleigh Backscattering level associated with the receive fiber is measurable in the second OTDR trace.

14. The OTDR device as claimed in claim 13, wherein a Rayleigh Backscattering level associated with the receive fiber is not measurable in the acquired OTDR trace.

15. The OTDR device as claimed in claim 13, wherein the first set of acquisition parameters are pre-set independently of the actual total length and the actual total insertion loss of the link under test.

16. The OTDR device as claimed in claim 13, wherein OTDR acquisitions are repeated and values of total length and total insertion loss of the link under test derived in a continuous manner and wherein values of total length and total insertion loss are saved upon request by the user.

17. The OTDR device as claimed in claim 13, further comprising deriving a value of a total length of the optical fiber link under test using the derived position.

18. An OTDR device for characterizing an optical fiber link under test connected at a remote end to a receive device comprising a reflective optical signature and a receive fiber, the OTDR device comprising:

an OTDR accquisition device connectable toward an end of the optical fiber link for performing at least a first OTDR acquisition toward the optical fiber link, wherein each OTDR acquisition is performed by propagating in the optical fiber link under test, a test signal corresponding to a set of acquisition parameters and detecting corresponding return light from the optical fiber link so as to obtain an OTDR trace representing backscattered and reflected light as a function of distance in the optical fiber link; and a processing unit receiving the acquired OTDR trace and configured for:
  in the acquired OTDR trace, detecting a signature pattern corresponding to said reflective optical signature to derive a position thereof;
  deriving a distance range where to measure a Rayleigh Backscattering level of the receive fiber, from the derived position of the reflective optical signature; and
  deriving a value of the total insertion loss of the link under test, from the Rayleigh Backscattering level within the derived distance range.

19. The OTDR device as claimed in claim 18, further comprising deriving a value of a total length of the optical fiber link under test using the derived position.

20. An OTDR device for characterizing an optical fiber link under test connected at a remote end to a receive device comprising a reflective optical signature and a receive fiber, the OTDR device comprising:

an OTDR accquisition device connectable toward an end of the optical fiber link for performing at least a first OTDR acquisition toward the optical fiber link, wherein each OTDR acquisition is performed by propagating in the optical fiber link under test, a test signal corresponding to a set of acquisition parameters and detecting corresponding return light from the optical fiber link so as to obtain an OTDR trace representing backscattered and reflected light as a function of distance in the optical fiber link; and a processing unit receiving the acquired OTDR trace and configured for,
  in the acquired OTDR trace, detecting a signature pattern corresponding to said reflective optical signature to derive a position thereof;
  deriving the position of the signature pattern by comparing the acquired OTDR trace to a segment that is extracted from a calibration OTDR acquisition and that is representative of the signature pattern, the calibration OTDR acquisition being performed toward the receive device without the link under test; and
  deriving a value of a total length of the optical fiber link under test using the derived position.

* * * * *